United States Patent [19]

Cooledge et al.

[11] Patent Number: 5,111,450
[45] Date of Patent: May 5, 1992

[54] DATA BUS TESTER FOR AUTONOMOUS DATA COMMUNICATIONS SYSTEM

[75] Inventors: Joseph T. Cooledge, Bellevue; Reza Sharif, Edmonds, both of Wash.

[73] Assignee: The Boeing Company, Seattle, Wash.

[21] Appl. No.: 430,420

[22] Filed: Nov. 1, 1989

[51] Int. Cl.[5] .................. H04J 3/14; H04B 3/46
[52] U.S. Cl. ..................... 370/13; 370/85.1; 371/29.5
[58] Field of Search .............. 370/13, 85.1; 371/20.1, 371/23, 27, 29.5; 364/550, 551.01, 514

[56] References Cited

U.S. PATENT DOCUMENTS 4,611,320  9/1986  Southard ................... 370/13
4,635,218  1/1987  Widdoes, Jr. .............. 371/23
4,847,838  7/1989  Kralik ..................... 371/29.5

Primary Examiner—Douglas W. Olms
Assistant Examiner—Min Jung
Attorney, Agent, or Firm—Bruce A. Kaser

[57] ABSTRACT

The invention disclosed here is a data bus system integration tester designed specifically to be used in connection with testing digital autonomous terminal access communication (DATAC) buses. The tester is characterized in that it listens to the digital information broadcast by other terminals on the bus, and also has the capability of transmitting information to simulate transmitting terminals. The tester is a non-microprocessor based system.

18 Claims, 35 Drawing Sheets

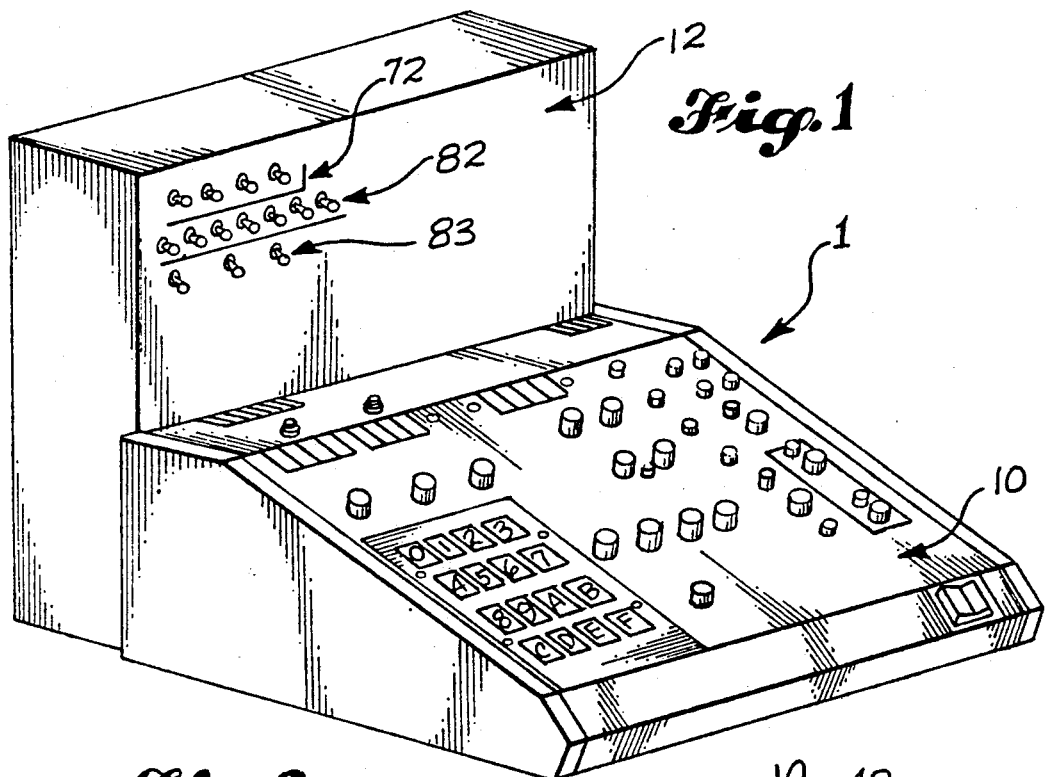
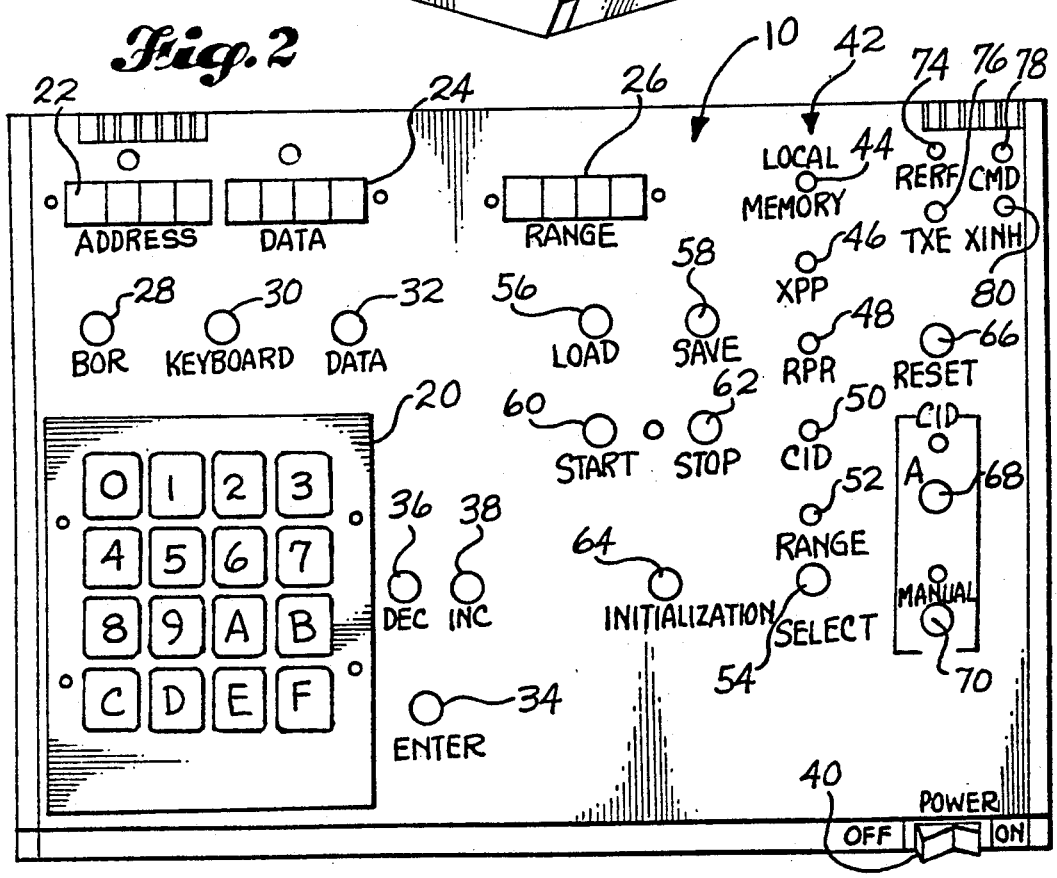

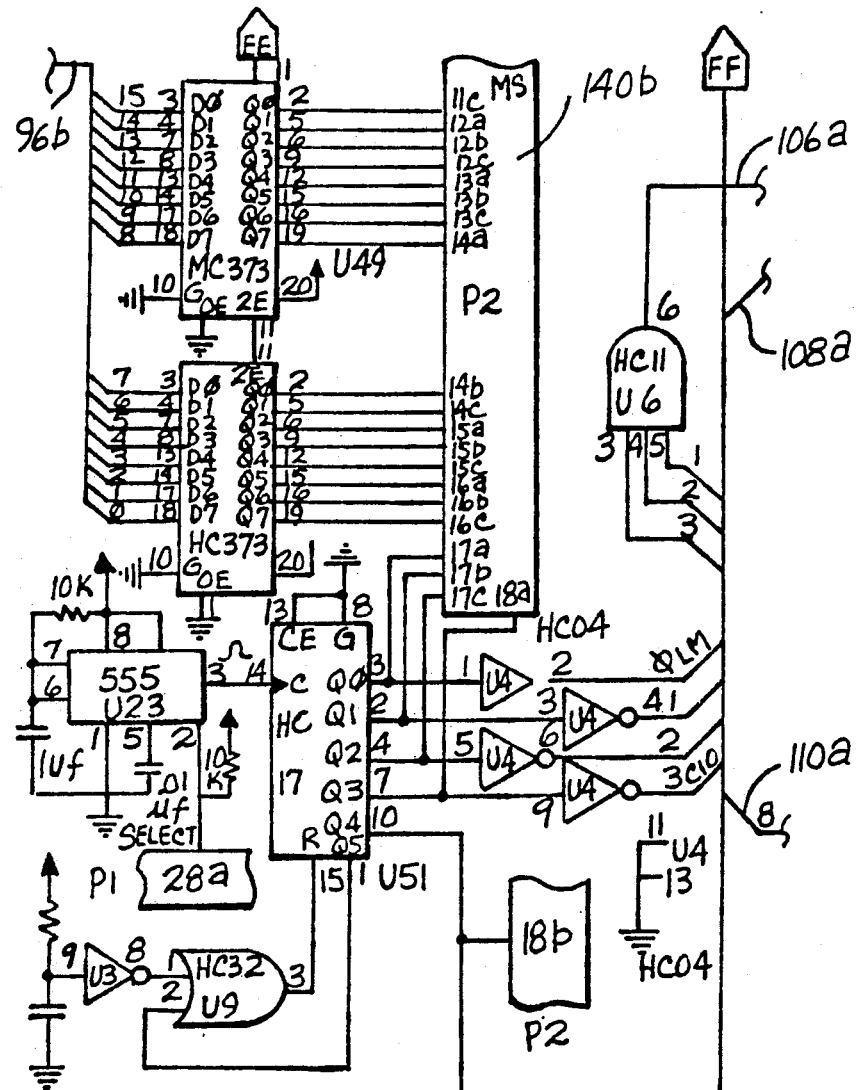
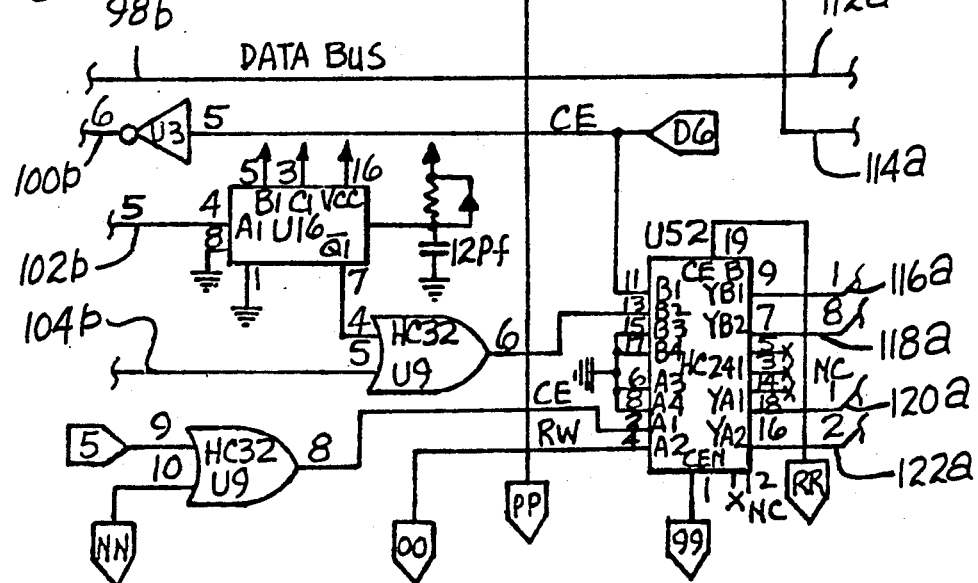
Fig. 8

| | X | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 00 | 80 | 100 | 180 | 200 | 280 | 300 | 380 | 400 | 480 | 500 | 580 | 600 | 680 | 700 | 780 |
| 1 | 08 | 88 | 108 | 188 | 208 | 288 | 308 | 388 | 408 | 488 | 508 | 588 | 608 | 688 | 708 | 788 |
| 2 | 10 | 90 | 110 | 190 | 210 | 290 | 310 | 390 | 410 | 490 | 510 | 590 | 610 | 690 | 710 | 790 |
| 3 | 18 | 98 | 118 | 198 | 218 | 298 | 318 | 398 | 418 | 498 | 518 | 598 | 618 | 698 | 718 | 798 |
| 4 | 20 | A0 | 120 | 1A0 | 220 | 2A0 | 320 | 3A0 | 420 | 4A0 | 520 | 5A0 | 620 | 6A0 | 720 | 7A0 |
| 5 | 28 | A8 | 128 | 1A8 | 228 | 2A8 | 328 | 3A8 | 428 | 4A8 | 528 | 5A8 | 628 | 6A8 | 728 | 7A8 |
| 6 | 30 | B0 | 130 | 1B0 | 230 | 2B0 | 330 | 3B0 | 430 | 4B0 | 530 | 5B0 | 630 | 6B0 | 730 | 7B0 |
| 7 | 38 | B8 | 138 | 1B8 | 238 | 2B8 | 338 | 3B8 | 438 | 4B8 | 538 | 5B8 | 638 | 6B8 | 738 | 7B8 |
| 8 | 40 | C0 | 140 | 1C0 | 240 | 2C0 | 340 | 3C0 | 440 | 4C0 | 540 | 5C0 | 640 | 6C0 | 740 | 7C0 |
| 9 | 48 | C8 | 148 | 1C8 | 248 | 2C8 | 348 | 3C8 | 448 | 4C8 | 548 | 5C8 | 648 | 6C8 | 748 | 7C8 |
| A | 50 | D0 | 150 | 1D0 | 250 | 2D0 | 350 | 3D0 | 450 | 4D0 | 550 | 5D0 | 650 | 6D0 | 750 | 7D0 |
| B | 58 | D8 | 158 | 1D8 | 258 | 2D8 | 358 | 3D8 | 458 | 4D8 | 558 | 5D8 | 658 | 6D8 | 758 | 7D8 |
| C | 60 | E0 | 160 | 1E0 | 260 | 2E0 | 360 | 3E0 | 460 | 4E0 | 560 | 5E0 | 660 | 6E0 | 760 | 7E0 |
| D | 68 | E8 | 168 | 1E8 | 268 | 2E8 | 368 | 3E8 | 468 | 4E8 | 568 | 5E8 | 668 | 6E8 | 768 | 7E8 |
| E | 70 | F0 | 170 | 1F0 | 270 | 2F0 | 370 | 3F0 | 470 | 4F0 | 570 | 5F0 | 670 | 6F0 | 770 | 7F0 |
| F | 78 | F8 | 178 | 1F8 | 278 | 2F8 | 378 | 3F8 | 478 | 4F8 | 578 | 5F8 | 678 | 6F8 | 778 | 7F8 |

(Y labels on left)

| | X | | | | | | | |
|---|---|---|---|---|---|---|---|---|
| | 0 | 1 | 2 | 3 | 4 | 5 | 6 | 7 |
| 0 | 00 | 100 | 200 | 300 | 400 | 500 | 600 | 700 |
| 1 | 08 | 108 | 208 | 308 | 408 | 508 | 608 | 708 |
| 2 | 10 | 110 | 210 | 310 | 410 | 510 | 610 | 710 |
| 3 | 18 | 118 | 218 | 318 | 418 | 518 | 618 | 718 |
| 4 | 20 | 120 | 220 | 320 | 420 | 520 | 620 | 720 |
| 5 | 28 | 128 | 228 | 328 | 428 | 528 | 628 | 728 |
| 6 | 30 | 130 | 230 | 330 | 430 | 530 | 630 | 730 |
| 7 | 38 | 138 | 238 | 338 | 438 | 538 | 638 | 738 |
| 8 | 40 | 140 | 240 | 340 | 440 | 540 | 640 | 740 |
| 9 | 48 | 148 | 248 | 348 | 448 | 548 | 648 | 748 |
| A | 50 | 150 | 250 | 350 | 450 | 550 | 650 | 750 |
| B | 58 | 158 | 258 | 358 | 458 | 558 | 658 | 758 |
| C | 60 | 160 | 260 | 360 | 460 | 560 | 660 | 760 |
| D | 68 | 168 | 268 | 368 | 468 | 568 | 668 | 768 |
| E | 70 | 170 | 270 | 370 | 470 | 570 | 670 | 770 |
| F | 78 | 178 | 278 | 378 | 478 | 578 | 678 | 778 |
| 10 | 80 | 180 | 280 | 380 | 480 | 580 | 680 | 780 |
| 11 | 88 | 188 | 288 | 388 | 488 | 588 | 688 | 788 |
| 12 | 90 | 190 | 290 | 390 | 490 | 590 | 690 | 790 |
| 13 | 98 | 198 | 298 | 398 | 498 | 598 | 698 | 798 |
| 14 | A0 | 1A0 | 2A0 | 3A0 | 4A0 | 5A0 | 6A0 | 7A0 |
| 15 | A8 | 1A8 | 2A8 | 3A8 | 4A8 | 5A8 | 6A8 | 7A8 |
| 16 | B0 | 1B0 | 2B0 | 3B0 | 4B0 | 5B0 | 6B0 | 7B0 |
| 17 | B8 | 1B8 | 2B8 | 3B8 | 4B8 | 5B8 | 6B8 | 7B8 |
| 18 | C0 | 1C0 | 2C0 | 3C0 | 4C0 | 5C0 | 6C0 | 7C0 |
| 19 | C8 | 1C8 | 2C8 | 3C8 | 4C8 | 5C8 | 6C8 | 7C8 |
| 1A | D0 | 1D0 | 2D0 | 3D0 | 4D0 | 5D0 | 6D0 | 7D0 |
| 1B | D8 | 1D8 | 2D8 | 3D8 | 4D8 | 5D8 | 6D8 | 7D8 |
| 1C | E0 | 1E0 | 2E0 | 3E0 | 4E0 | 5E0 | 6E0 | 7E0 |
| 1D | E8 | 1E8 | 2E8 | 3E8 | 4E8 | 5E8 | 6E8 | 7E8 |
| 1E | F0 | 1F0 | 2F0 | 3F0 | 4F0 | 5F0 | 6F0 | 7F0 |
| 1F | F8 | 1F8 | 2F8 | 3F8 | 4F8 | 5F8 | 6F8 | 7F8 |

BOEING PROPRIETARY
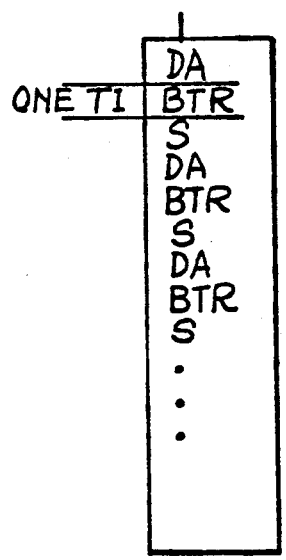
XPP
BLOCK MODE          INDEPENDENT MODE
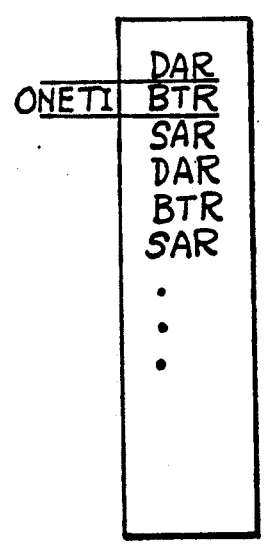
Fig. 27

DATA BUS TESTER FOR AUTONOMOUS DATA COMMUNICATIONS SYSTEM

TECHNICAL FIELD

This invention generally relates to devices for testing system and subsystems integration over data buses, and in particular, to the testing of autonomous data bus systems via non-microprocessor based test devices that both listen to other subsystems on the bus, and simulate transmitting subsystems.

BACKGROUND ART

A new type of data bus was developed in the 1980's by The Boeing Commercial Airplane Company for use in connection with onboard aircraft subsystems or terminals (hereafter "terminals" and "subsystems" will be used interchangeably). This data bus provides digital autonomous terminal access communication (DATAC), and its protocol standards are now identified in the field as ARINC characteristic 629.

DATAC is designed to replace the ARINC 429 data bus system which is currently in use on some commercial aircraft. The most significant difference between the DATAC bus and the ARINC 429 bus is that DATAC is a multi-transmitter, bidirectional bus, whereas ARINC 429 is a single-transmitter, unidirectional (one-way) type bus.

The DATAC bus is similar to the Mil-Std. 1553 bus currently used on some military aircraft. The most significant difference between DATAC and Mil-Std. 1553 is that DATAC does not require a discrete data bus controller.

The problem with a discrete controller is that in the event the controller malfunctions, the entire data bus will be taken out of service. As a practical matter, this result is avoided in the Mil-Std. 1553 system by providing multiple controllers that are redundant. If one controller fails, another takes over.

The DATAC bus does not require a controller because subsystems that communicate on the bus have built-in intelligence which allows them to independently listen to the bus, and to transmit data when certain protocol conditions are met. For example, to receive data, each terminal or subsystem passively monitors the data bus. Data required by the terminal is validated and passed into the system's addressable memory. To transmit, the terminal maintains a transmission time slot on the bus. Prior to the actual transmission, the terminal first assembles a complete data message, determines when it may transmit, and then sends the message.

An excellent explanation of the DATAC bus and its protocol features may be found in U.S. Pat. No. 4,471,481, issued to John L. Shaw and Hans K. Herzog on Sep. 11, 1984. The type of aircraft subsystem that might operate on the bus would typically be autopilot, air conditioning, fire protection, control surfaces, and similar subsystems.

The DATAC bus is inherently more reliable than both the ARINC 429 and Mil-Std. 1553 busses as it does not require a single controller to operate the bus, and it has a simpler wiring configuration. One or more discrete controllers, plus wiring from the controllers to data bus subsystems, represent a significant weight and installation penalty. Reduction in weight and simplification in physical design, which DATAC provides, is always desirable in aircraft because it results in paybacks in the form of increased payload capacity and/or improved fuel economy.

Many data bus testers are microprocessor based systems whose software artificially simulates the bus to be tested. These types of testers are costly because of their software requirements, and have reliability problems in that they are sensitive to continuing software bugs for a period of time after they have been put into service. The tester disclosed herein solves this problem with respect to the DATAC bus in that it is a non-microprocessor based device which actually incorporates the DATAC VLSI chip. In other words, it has no software requirements.

U.S. Pat. No. 4,383,312 discloses a non-microprocessor based system that is used to test data buses. However, there are several notable differences between the '312 patent and the invention which is disclosed here. Although the '312 tester provides a simulated source and sink for data, a function which the present invention also accomplishes, the '312 tester simulates only a single terminal. Contrastingly, the present invention has the capability of simulating multiple terminals. Further, the '312 patent does not include the nonvolatile memory features of the present invention, and does not have the same kind of user-friendly data input/outputs. These differences, and others, will become apparent upon considering the following description.

SUMMARY OF THE INVENTION

The present invention is a data bus system integration tester designed to be used solely to test a digital autonomous terminal access communication (DATAC) bus, also known as ARINC 629. DATAC terminals operating on the bus both transmit and receive data on it. To receive data, each terminal passively monitors the bus. Data required by the terminal is validated and passed into its addressable memory. To transmit, each terminal maintains a unique transmission time slot on the bus. Each terminal assembles a complete data message, determines when it may transmit, and then sends the message. The tester disclosed herein is characterized in that it performs the same function. That is, it listens to the digital information transmitted on the DATAC bus by other terminals, in accordance with user instructions, and also has the capability of transmitting certain information as though it were another subsystem operating on the bus.

The tester includes a local memory RAM that is operable to receive and store digital information from the bus. This local memory is also connected to other memories in the tester, as described below, and has the capability of storing other addressable digital information input by the user for subsequent transmission on the bus.

A receive personality RAM, operatively connected to the local memory RAM, has the function of permitting the tester to listen to other terminals on the bus. In accordance with user instructions, it identifies the label portion of digital information transmitted by a given terminal, and causes such information to be stored in the local memory RAM at a certain addressable location selected by the user. The user later views this information on a panel display and verifies whether it is correct.

A transmit personality RAM, also interfaced to the local memory RAM, has the function of transmitting information on the bus thereby enabling the tester to simulate a transmitting terminal. This RAM contains the user-selected digital label that is to be transmitted on the bus. The transmit personality RAM causes the local memory RAM to provide certain prestored digital data for transmission along with the label to be transmitted. The prestored data in local memory is also input by the user. When in the transmit mode, the user may select the transmitting channel identification either manually or automatically by presetting a channel identification (CID) RAM.

The local memory, receive personality and transmit personality RAMs are all dual-port volatile memories. The CID RAM is also volatile. Thus, any information stored in these memories is lost when power to the tester is disabled. If the user desires to save this information, he may select any desired ranges of digital label and/or data information residing in any of the volatile memories and save them in a non-volatile EEPROM. Some or all of this information may, at the user's option, be subsequently loaded into the volatile memory.

An advantage of the present invention is that it is a non-microprocessor based system that is highly portable and user-friendly. Information in any of the memories may be easily edited or viewed by making simple keyboard entries on the front panel of the device. The front panel also has several digital displays which inform the user as to address, data and range information.

Various abbreviations and acronyms have already been used herein and new ones will be introduced later. Although most or all of these are defined in the text as they are introduced, for the reader's convenience, a table of abbreviations and acronyms has been included in the specification as Appendix B.

BRIEF DESCRIPTION OF THE DRAWING

In the drawings, like reference numerals and letters refer to like parts throughout the various views, and wherein:

FIG. 1 is a pictorial view of a DATAC bus tester or test device in accordance with the invention, and shows a front panel having various data entry keys and displays, and a rear panel which houses integrated circuitry;

FIG. 2 is a frontal view of the front panel shown in FIG. 1;

FIG. 8 is a fifth electrical schematic that is to be read in conjunction with FIGS. 4–7;

FIG. 23 is a 16×16 memory map in hexadecimal;

FIG. 24 is a 32×8 memory map in hexadecimal;

FIG. 27 is a schematic illustrating two possible transmission order modes for the device's transmit personality RAM;

BEST MODE FOR CARRYING OUT THE INVENTION

1. The Front Panel

Referring first to FIGS. 1 and 2, FIG. 1 is a perspective view of a test device 1 in accordance with the invention having a front panel 10 and rear panel 12. The front panel 10 enables user-friendly input and output of DATAC information, in a manner that will be further described below, and the rear panel 12 houses an electronics board containing the hardware elements of the invention. Hereafter, the latter will be referred to as the "DABT board" or "DABT panel."

Figure 3:
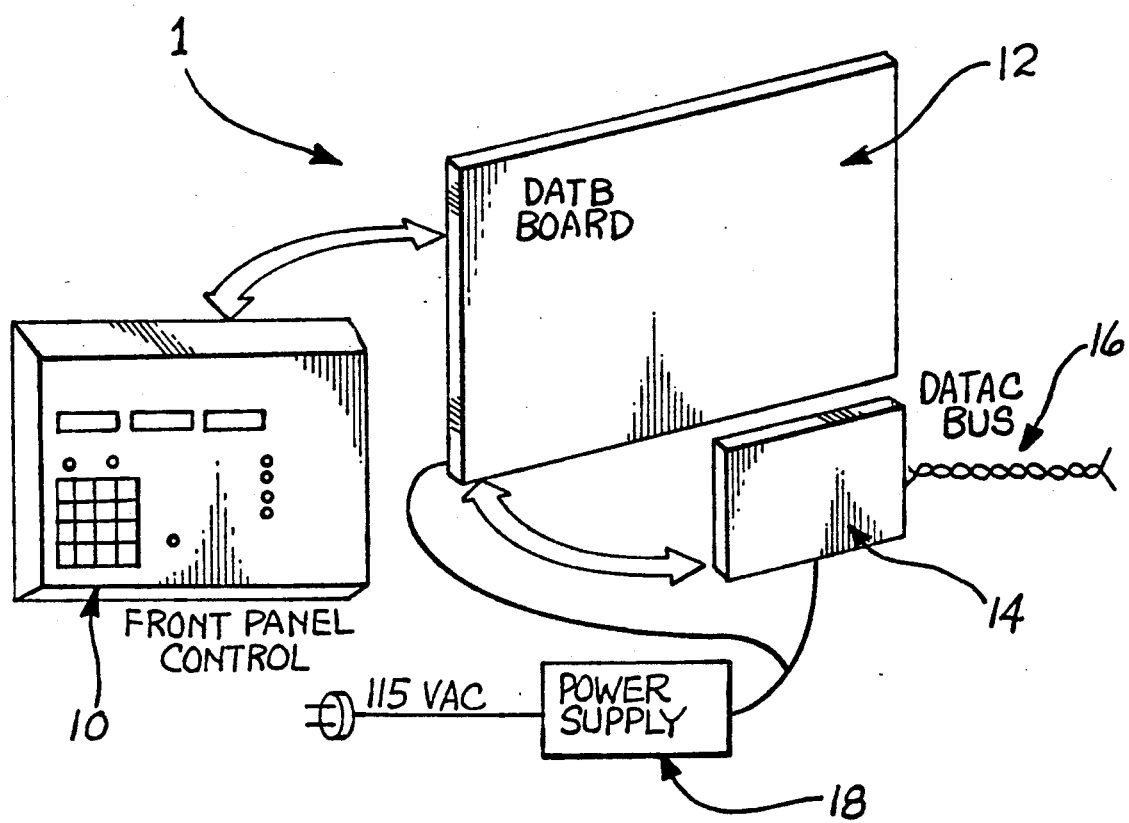
FIG. 3 is a simplified block diagram of the test device of FIG. 1.

FIG. 3 is a simplified block diagram showing the interrelationship of the parts just mentioned. The electronics in the DABT board are operatively connected to the front panel 10 in a manner to be described later. The front panel 10 is used to input and display certain test information, all of which is processed by board 12. Board 12 is further connected to a DTB test board 14, which operatively connects DABT board 12 to the DATAC bus 16.

The DTB board 14 is a pre-existing component not considered to be part of the present invention which would be familiar to a skilled person having general familiarity with DATAC. By way of example, the DTB board 14 has been manufactured since 1985 by the NEC Corporation of Tokyo, Japan. It is described in a manual entitled "User's Manual for DATAC Test Board," which was published by NEC in December of 1985.

The front panel 10, DABT board 12, and DTB board 14 are all supplied with power from a conventional 115 VAC power source 18.

Referring again to FIGS. 1 and 2, and in particular to FIG. 2, the various controls and displays on front panel 10 will now be described. The panel 10 includes a hexadecimal keyboard 20 which permits the user to input address, data and range information. At the upper left-hand corner of the front panel 12 are address and data displays 22, 24, and in the upper center of the panel is a range display 26. All of these displays 22, 24, 26 are in hexadecimal format.

Immediately above the left-hand corner of keyboard 20 is a beginning of RAM (BOR) key 28. This key points to the beginning of a certain preselected RAM device located on the DABT board 12 after such RAM has been enabled, which will be further described later. A keyboard key 30 is used in conjunction with the keypad 20 for editing address information which is displayed as entered at 22. A data key 32 is similarly used in conjunction with keypad 20 to display data information at 24. An entry or "enter" key 34 causes address and data information to be entered into the device's integrated circuit logic. Increment and decrement keys 36, 38 respectively allow the user to increment or decrement addresses by "1".

The device 1 has nonvolatile memory which enables the user to save test information for later use after the device's power switch 40 is pressed to the "off" position. A row of lights, indicated generally by arrow 42, show the user which one of various memory devices or RAMs on the DABT board 12 is enabled. A first light 44 indicates enablement of local memory, a second 46 indicates enablement of a transmit personality RAM (XPR), a third 48 indicates enablement of a receive personality RAM (RPR), a fourth 50 indicates enablement of a channel ID (CID) RAM, and a fifth 52 indicates enablement of range selection for address/data information which is either saved or loaded to or from nonvolatile memory. Each of these items just described are sequentially enabled by activation of a select key 54.

A load key 56 enables the user to load stored information from the device's nonvolatile memory into its volatile memories, i.e., local memory RAM, and XPR, RPR and CID memories. A save key 58 conversely permits the user to save information from XPR, RPR, and CID memories into non-volatile memory. Start and stop keys 60, 62 respectively permit the user to initiate and stop either loading or saving operations. When the device is first turned on by means of power switch 40, an initialization key 64 enables the user to initialize all of the volatile memories in the device 1.

Figure 16:
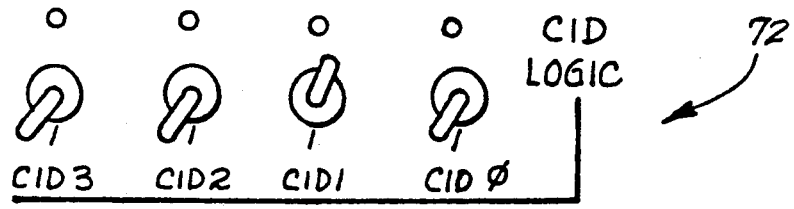
FIG. 16 is a frontal view of a row of switches that are used for manually setting CID logic.

A reset key 66 permits the user to reset the DATAC VLSI. Automatic/manual CID keys 68, 70 allow the user to configure the device so that the device will look up channel ID from certain appropriate memory locations, or look for channel ID from the positions of four discrete logic switches that are in a row which is indicated generally by arrow 72. These are positioned on the face of the DABT board panel 12 and a better view of them is shown in FIG. 16.

The front panel 10 also has a plurality of status lights 74, 76, 78, 80 which respectively indicate (a) whether an error is detected on the DATAC bus (RERF); (b) whether the transmit error count is full (TXE); (c) whether the DATAC VLSI is operating in C-mode (CMD); and (d) whether the DATAC transmitter is inhibited (XINH).

Figure 17:
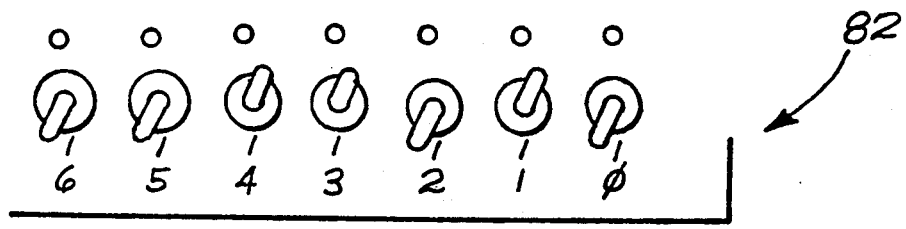
FIG. 17 is a frontal view of a row of switches that are used for manually setting TG logic.
Figure 18:
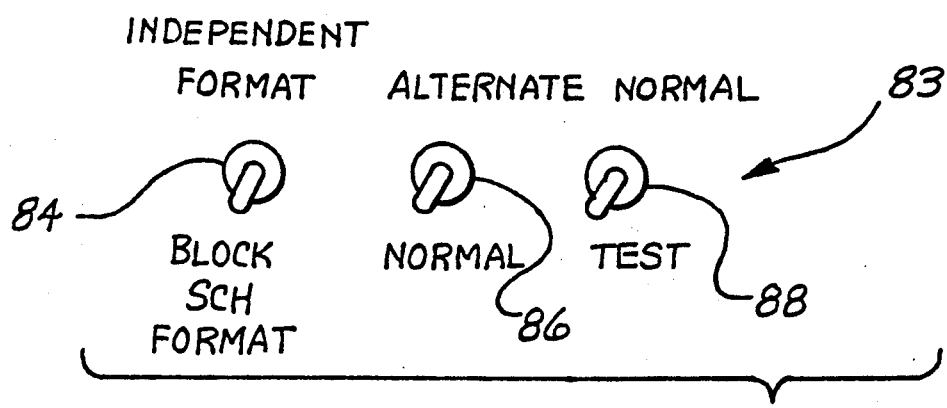
FIG. 18 is a frontal view of three switches that are used to manually configure transmission modes of the device.

The DABT board panel 12 also has seven switches in a row generally by arrow 82. These permit the user to set the DATAC terminal gap (TG). Another row of three switches 84, 86, 88 (indicated generally by arrow 83) permits the user to modify parts of the receive and transmit personality RAM on the DABT board 12. For example, a (LABEL) transmission order in the transmit personality RAM (XPR) may be set by the independent/block switch 84. This will be further described later. FIG. 17 provides a better view of the TG switches indicated at 82 in FIG. 1, and FIG. 18 provides a better view of switch row 83.

2. Description of the Circuitry

Figure 19A:
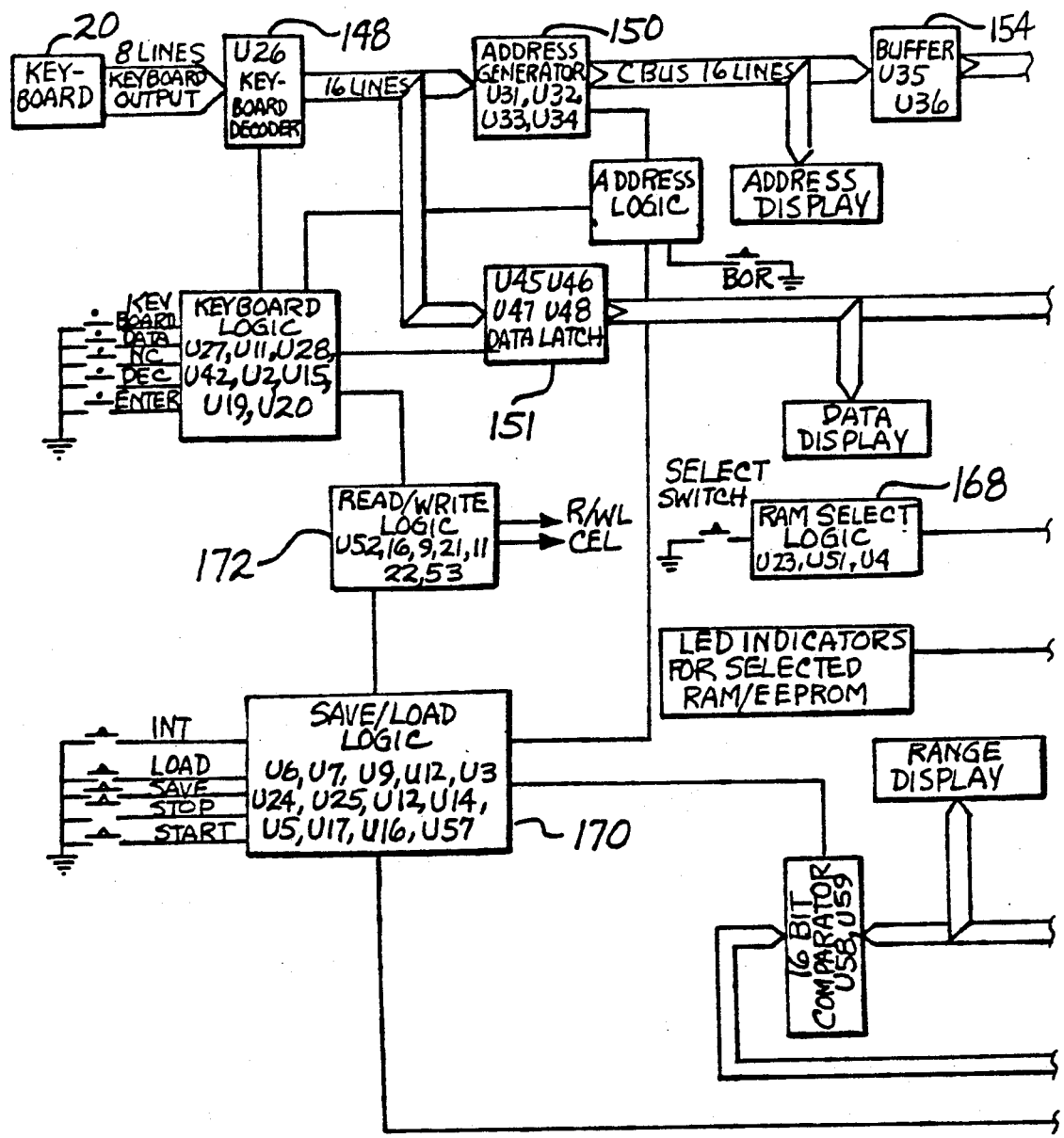
FIGS. 19A and 19B are simplified schematic block diagram of the test device.
Figure 19B:
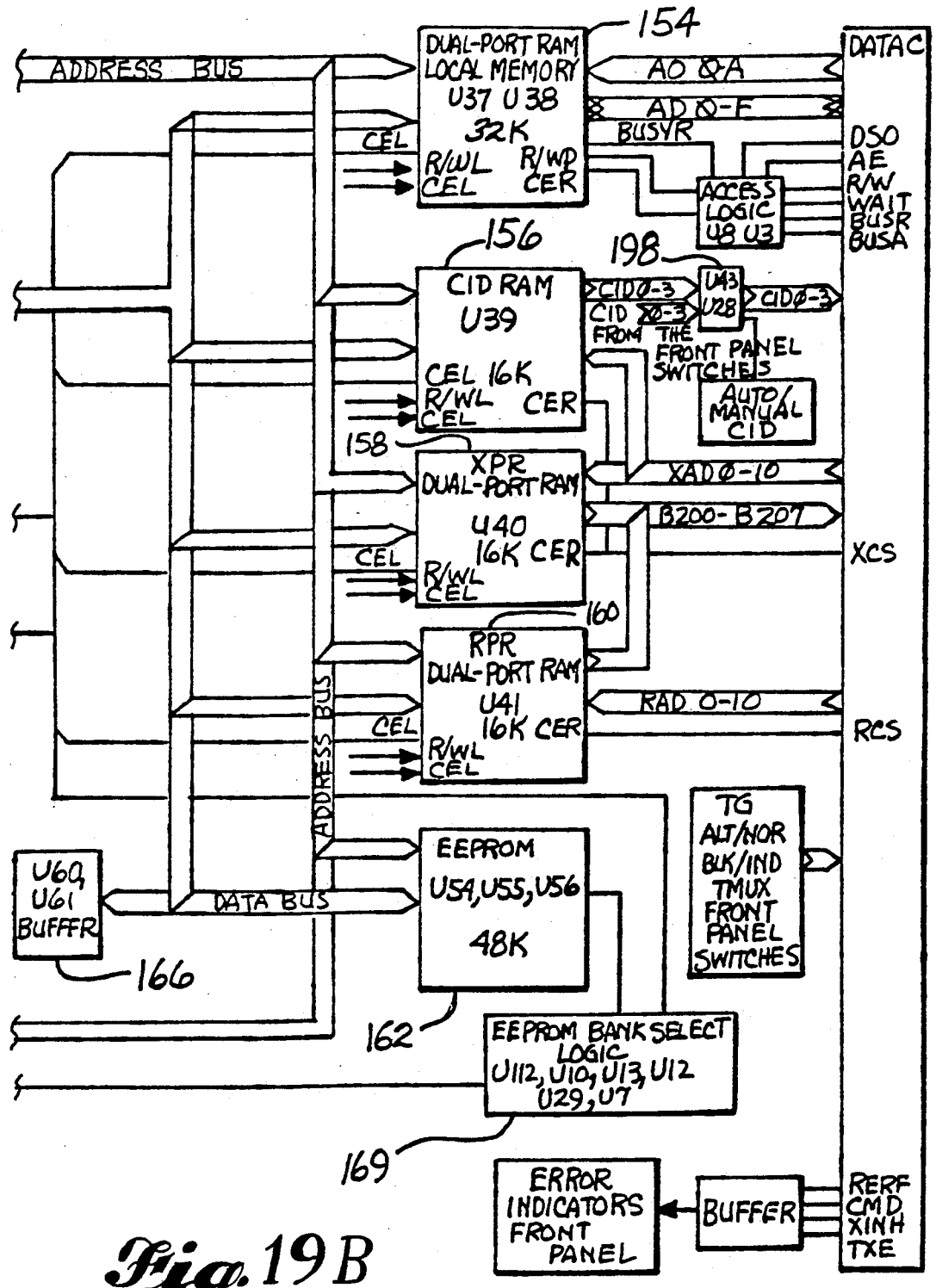

FIGS. 4–13 and 19 illustrate how the invention is made. FIGS. 4–13 are electrical schematic diagrams showing all of the various electrical components which make up the invention. FIG. 19 is a block schematic diagram which summarizes and condenses the schematics of FIGS. 4–13.

All of the parts shown in FIGS. 4–13 are labeled with conventional identification symbols that would be familiar to the skilled person and would enable the skilled person to assemble the device 1.

Figure 4A:
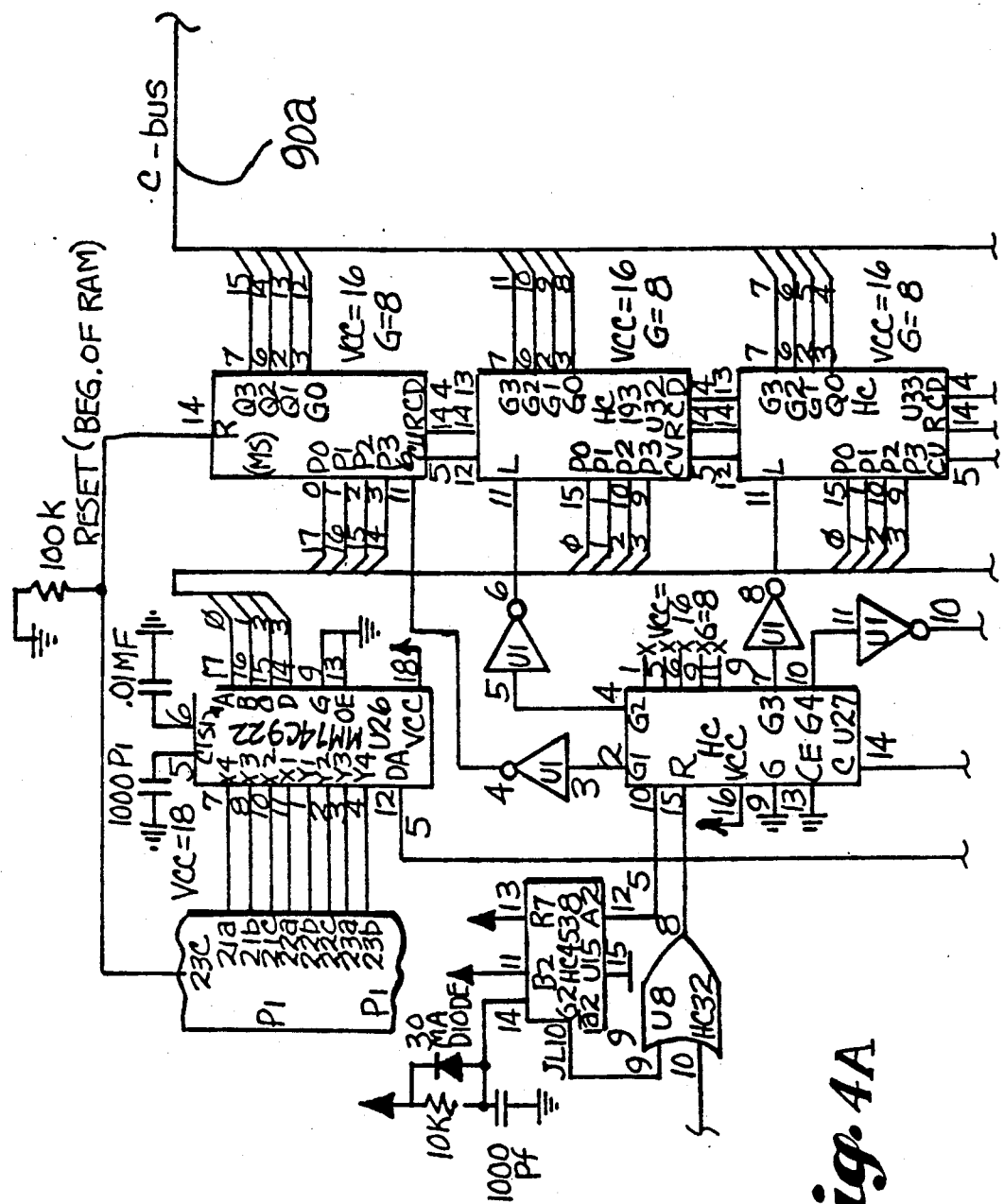
FIGS. 4A and 4B are first schematic of the test device's electrical circuitry.
Figure 4B:
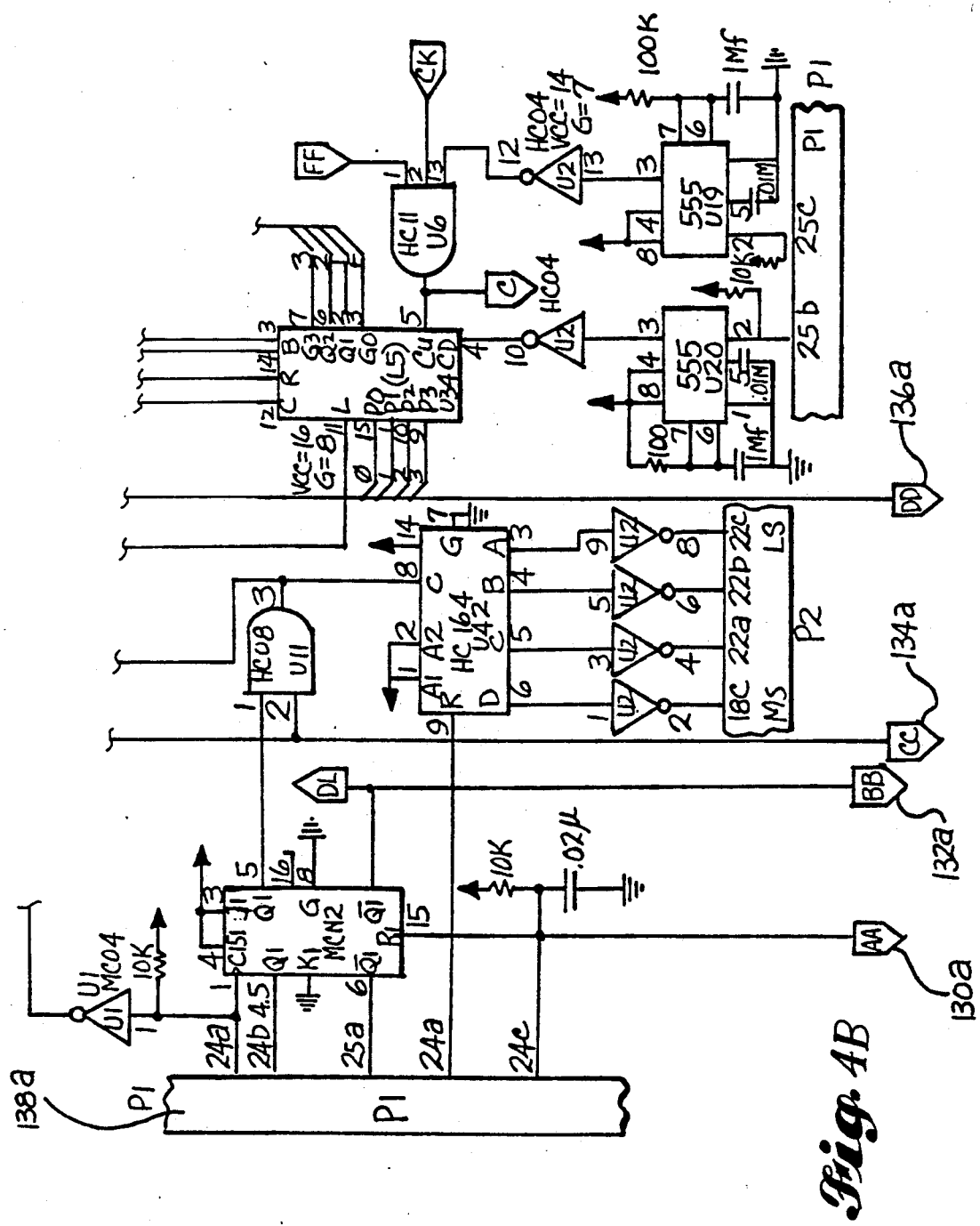
Figure 5A:
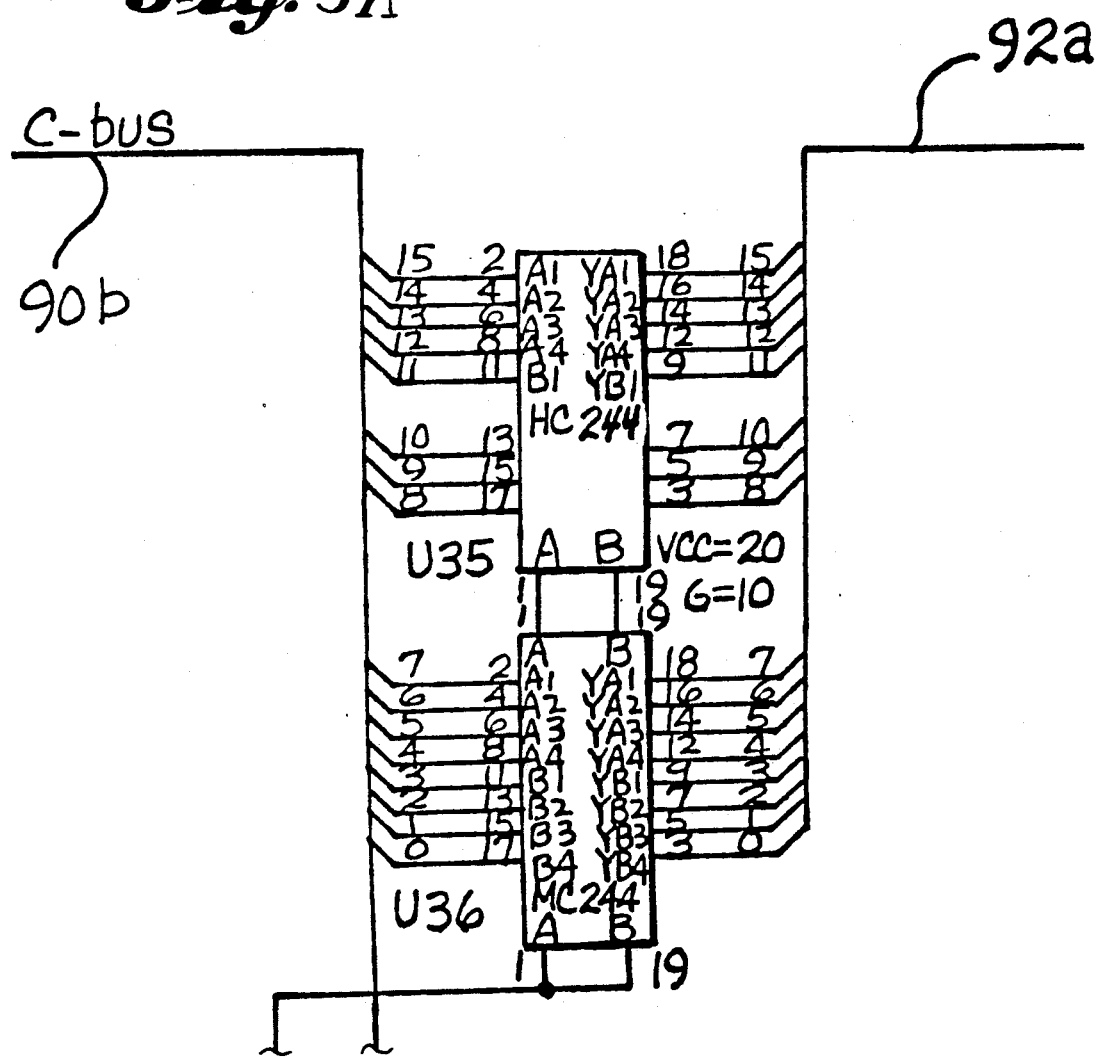
FIGS. 5A and 5B are second electrical schematic that is to be read in conjunction with FIG. 4.
Figure 5B:
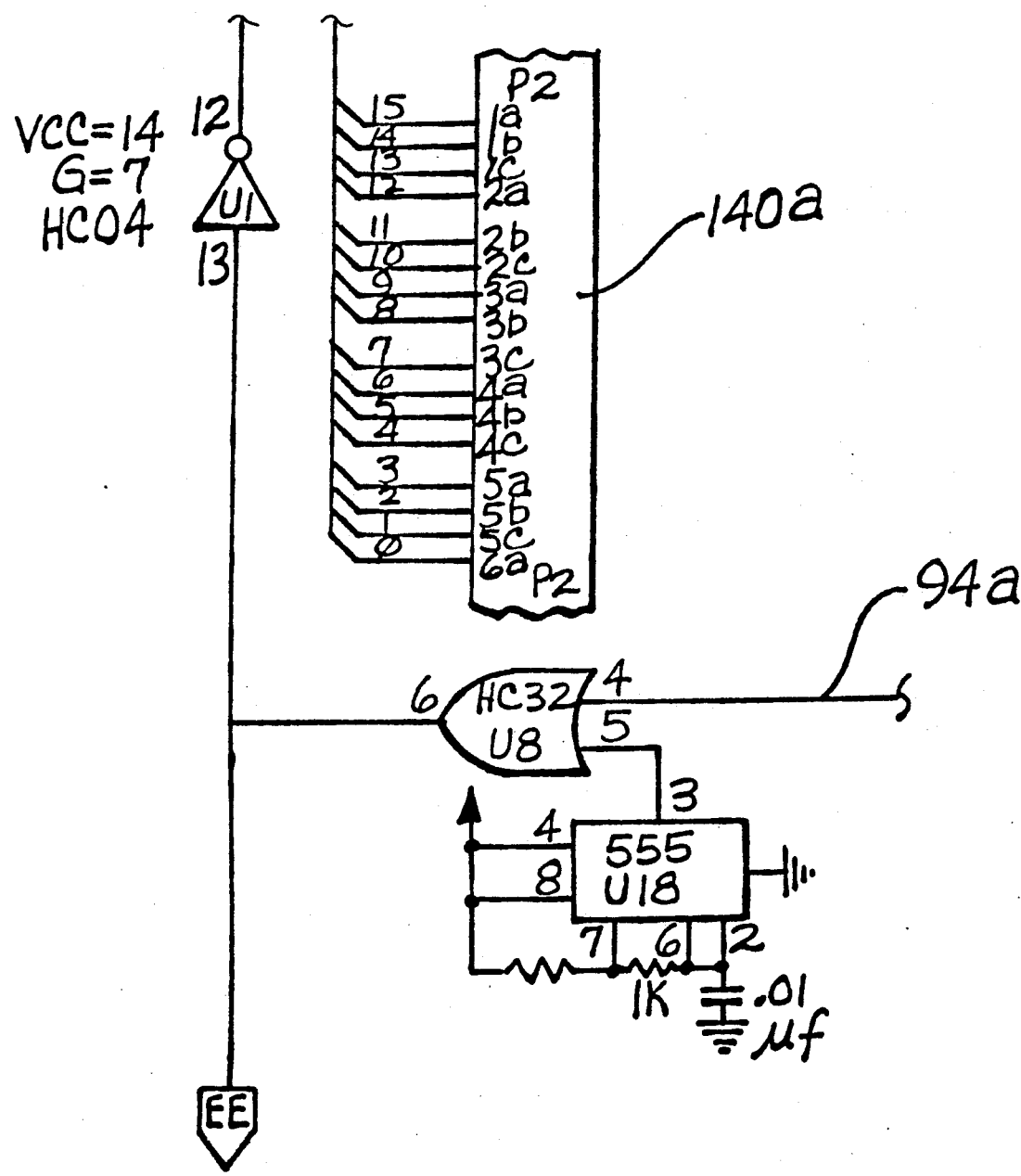
Figure 6A:
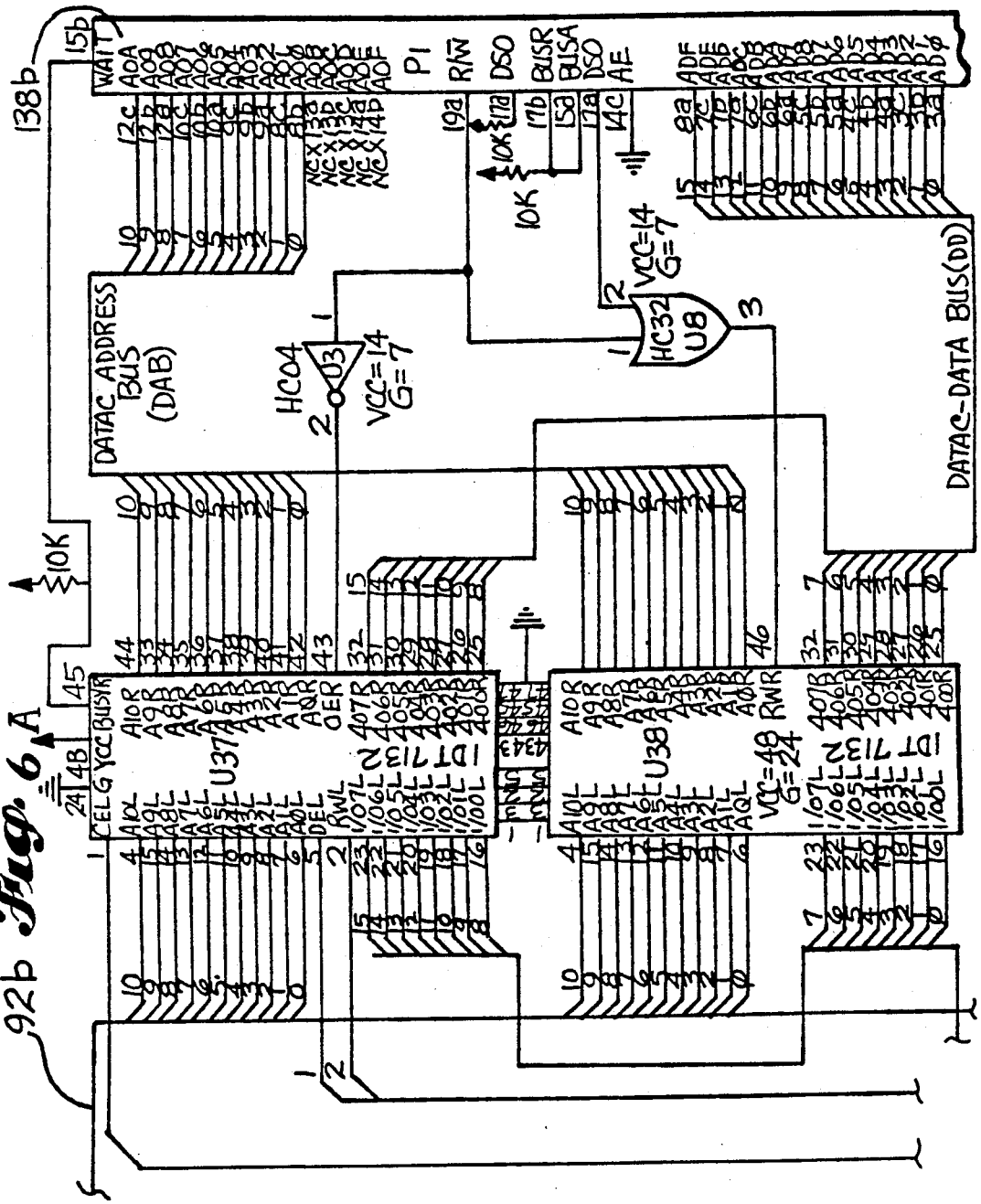
FIGS. 6A and 6B are third electrical schematic that is to be read in conjunction with FIGS. 4–5.
Figure 6B:
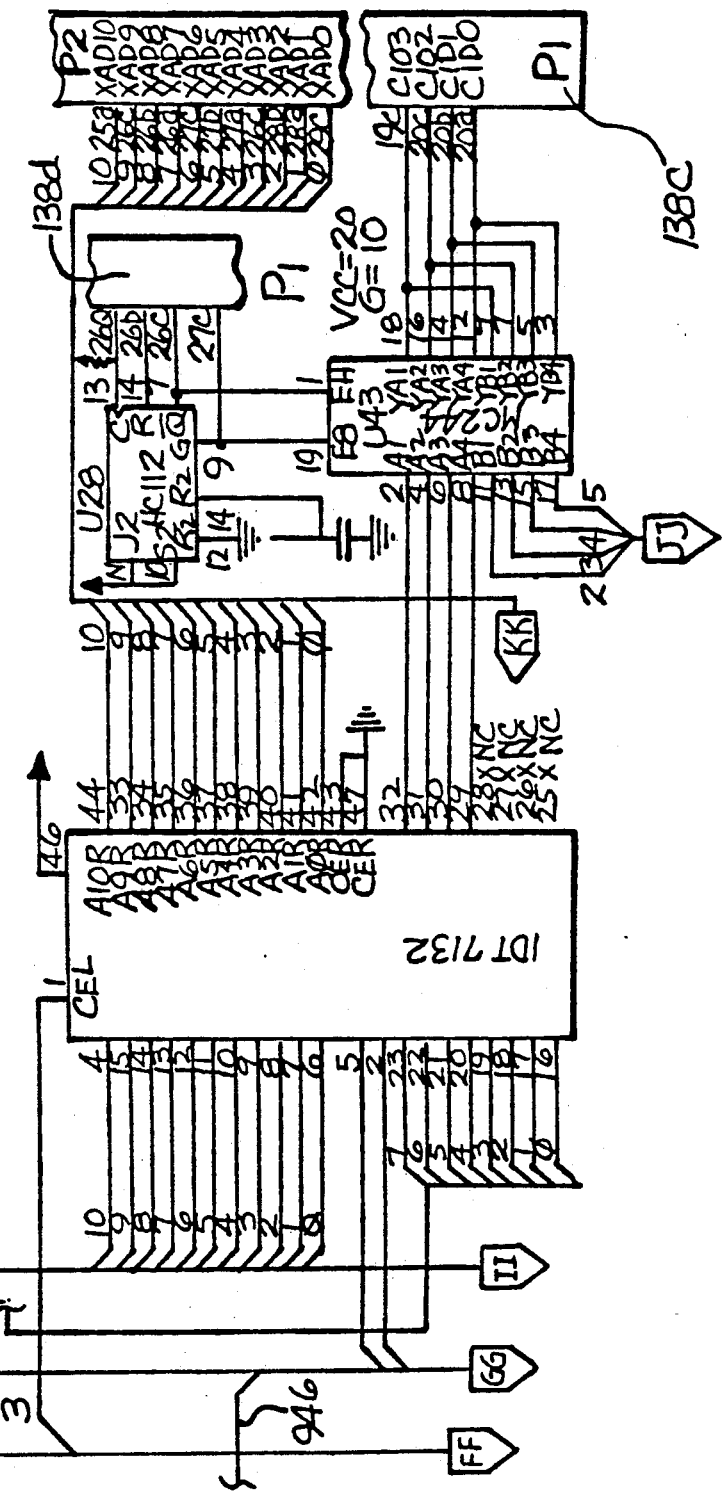

FIGS. 4, 5 and 6 are a first set of drawings which are to be read together. Line 90a on the right-hand corner of FIG. 4 connects to line 90b on the upper left-hand corner of FIG. 5. Similarly, lines 92a and 94a on the upper and lower right-hand corners of FIG. 5 are connected to lines 92b and 94b on the upper and lower left-hand corners of FIG. 6.

Figure 7:
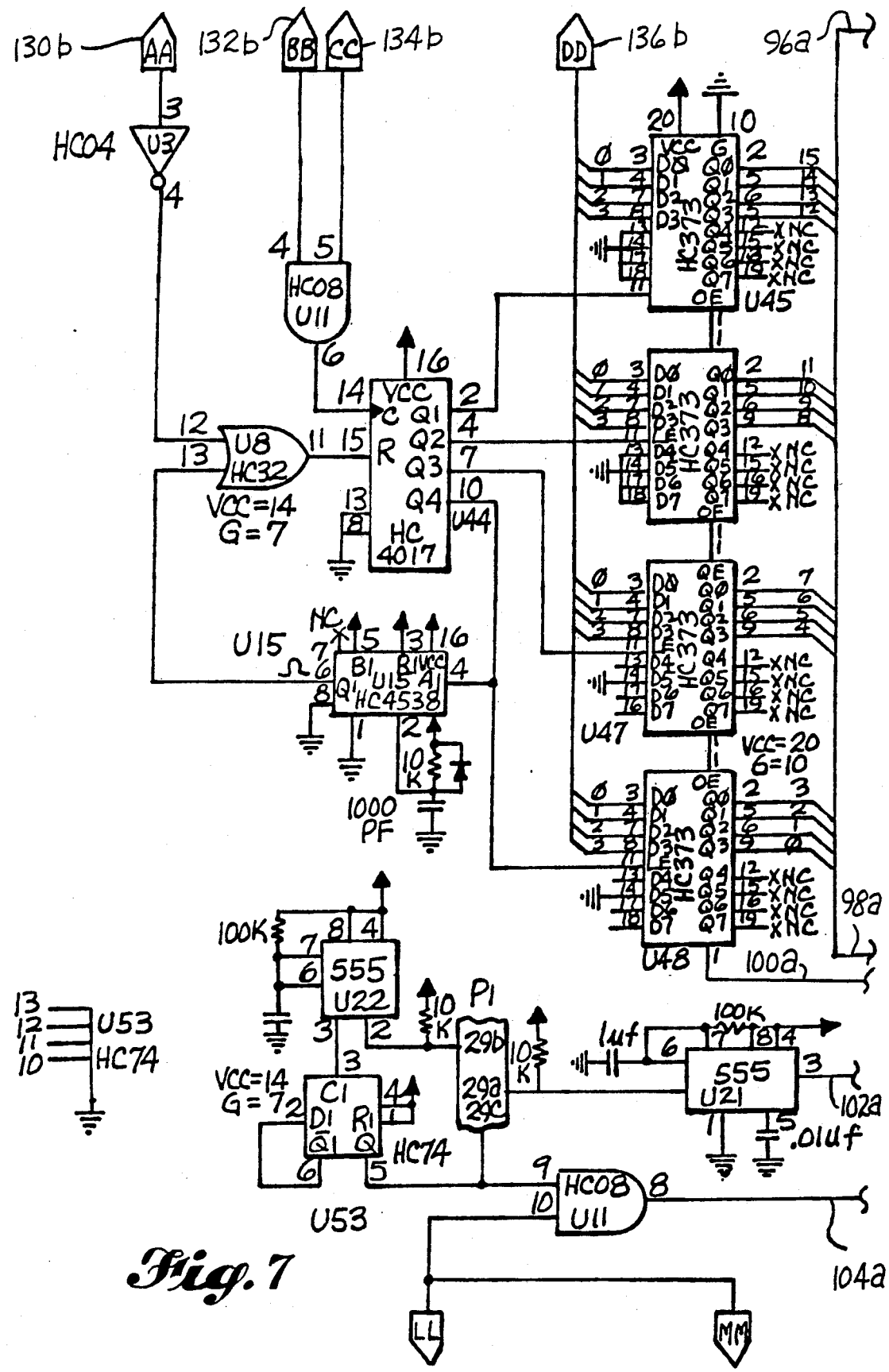
FIG. 7 is a fourth electrical schematic that is to be read in conjunction with FIGS. 4–6.
Figure 9A:
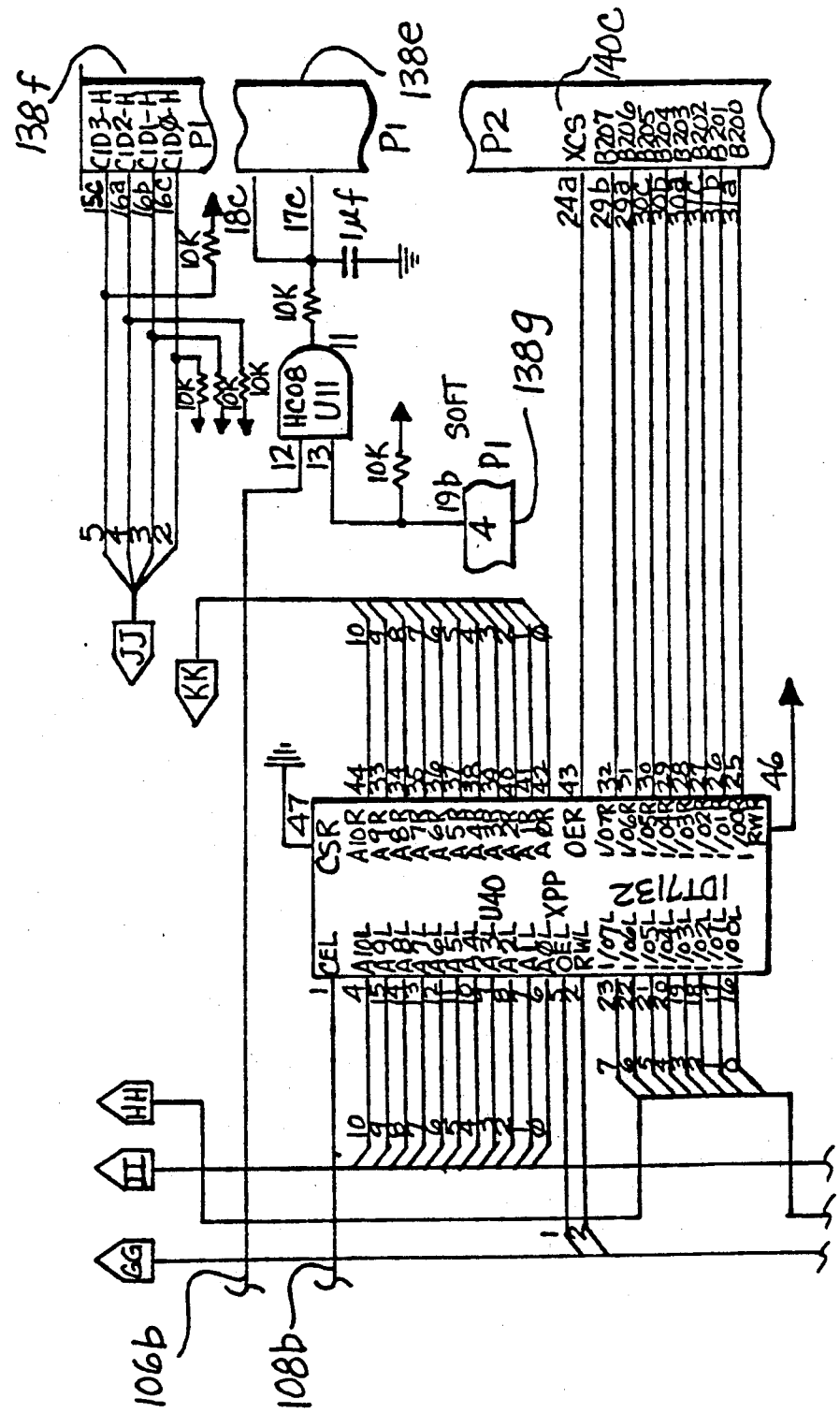
FIGS. 9A and 9B are sixth electrical schematic that is to be read in conjunction with FIGS. 4–8.
Figure 9B:
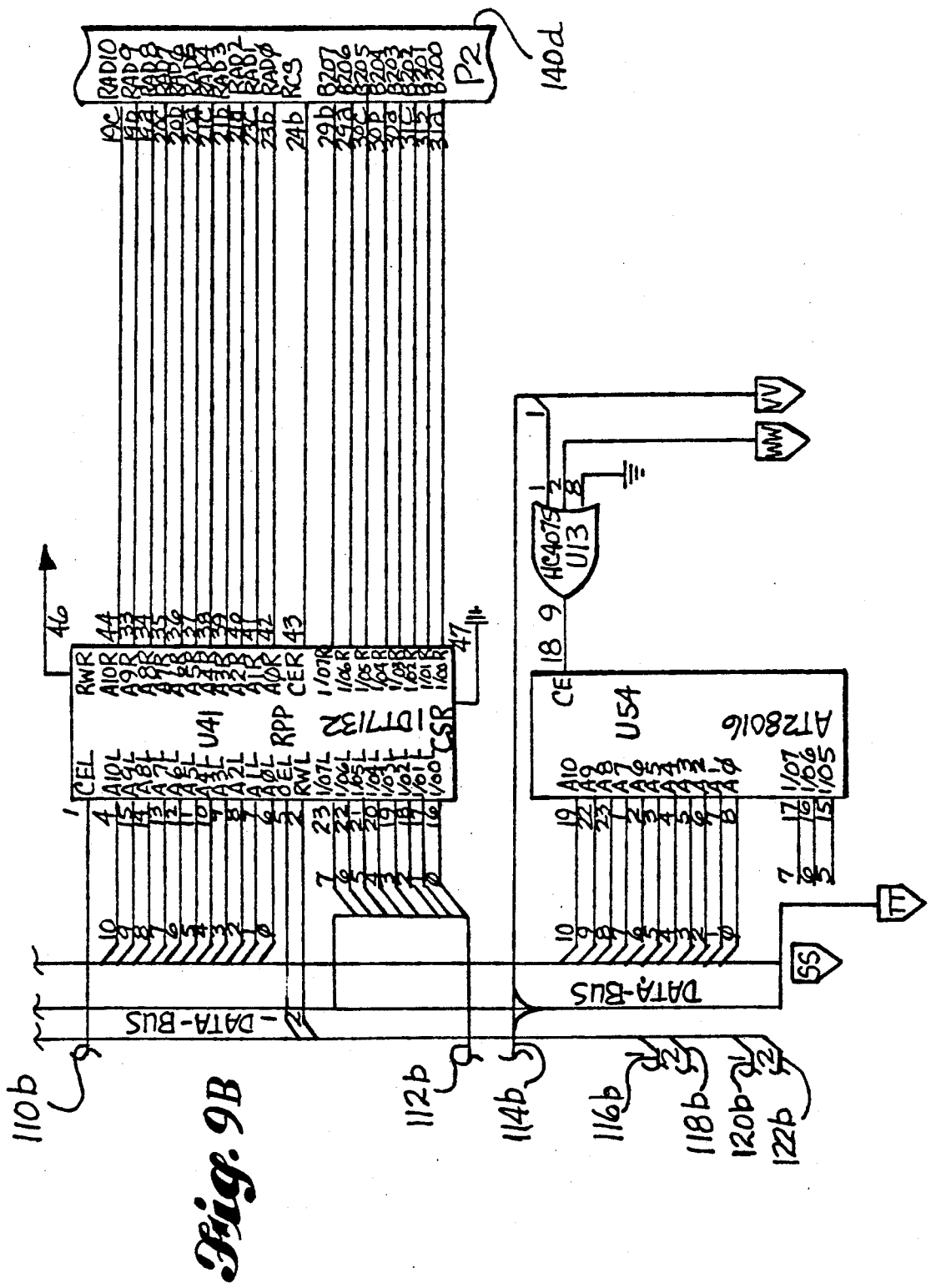
Figure 10A:
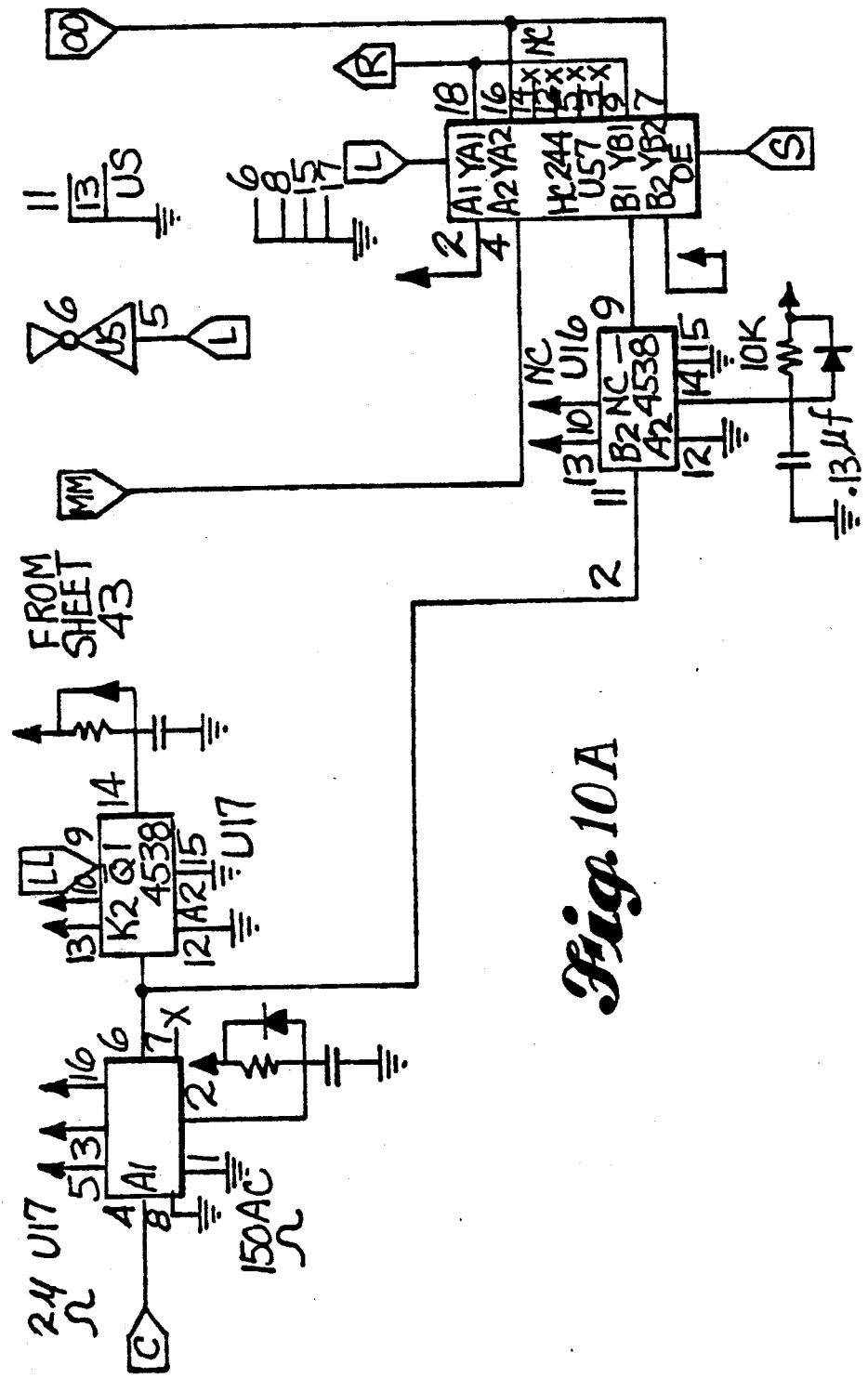
FIGS. 10A and 10B are seventh electrical schematic that is to be read in conjunction with FIGS. 4–9.
Figure 10B:
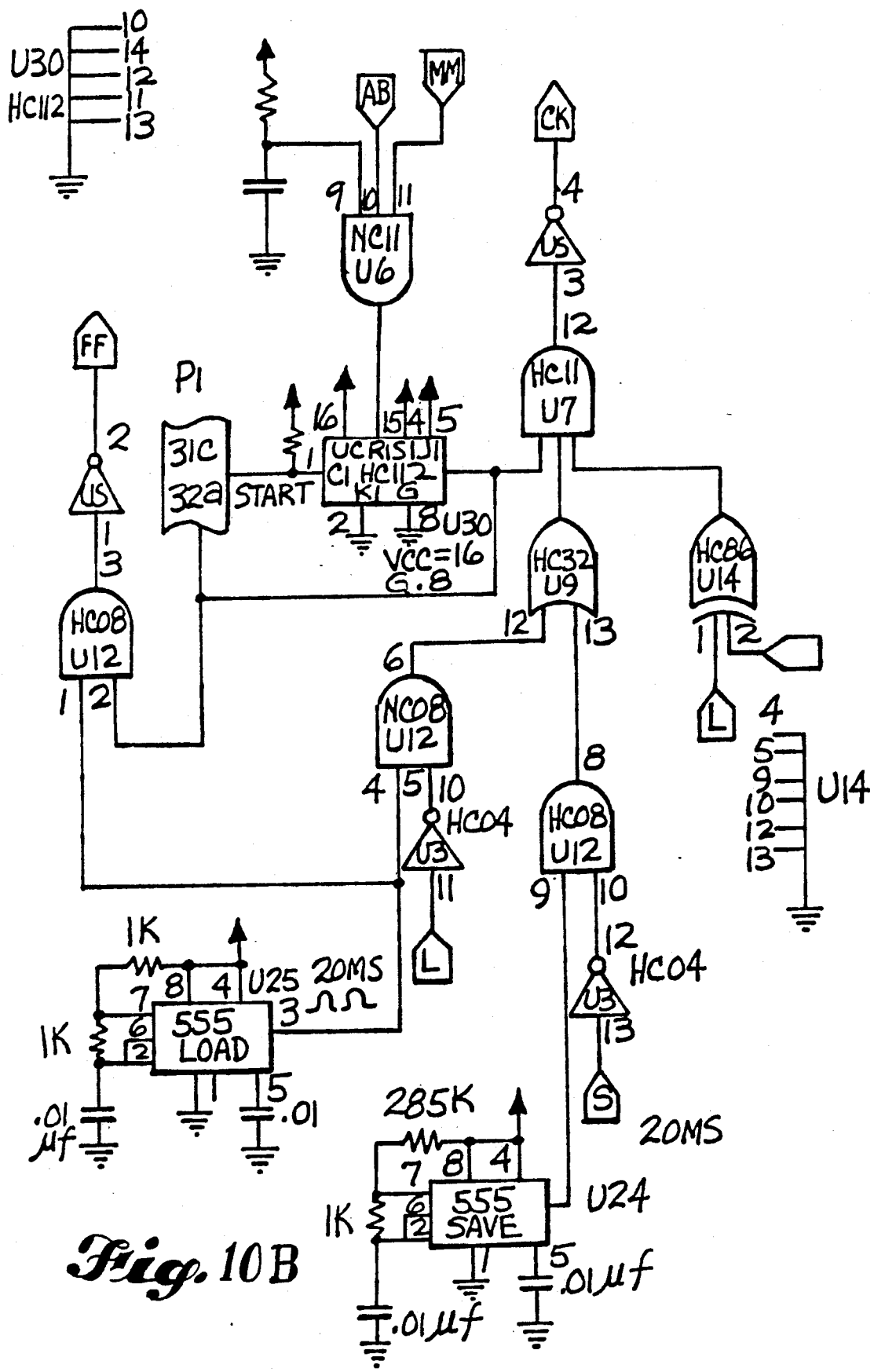

FIGS. 7–9 are a second set of schematics which are to be read together. Lines 96a, 98a, 100a, 102a and 104a on the right-hand side of FIG. 7 are correspondingly connected to lines 96b, 98b, 100b, 102b, and 104b on the left-hand side of FIG. 8. Lines 106a, 108a, 110a, 112a, 114a 116a, 118a, 120a and 122a on the right-hand side of FIG. 8 are respectively connected to 106b, 108b, 110b, 112b, 114b 116b, 118b, 120b and 122b on the left-hand side of FIG. 9.

Figure 11A:
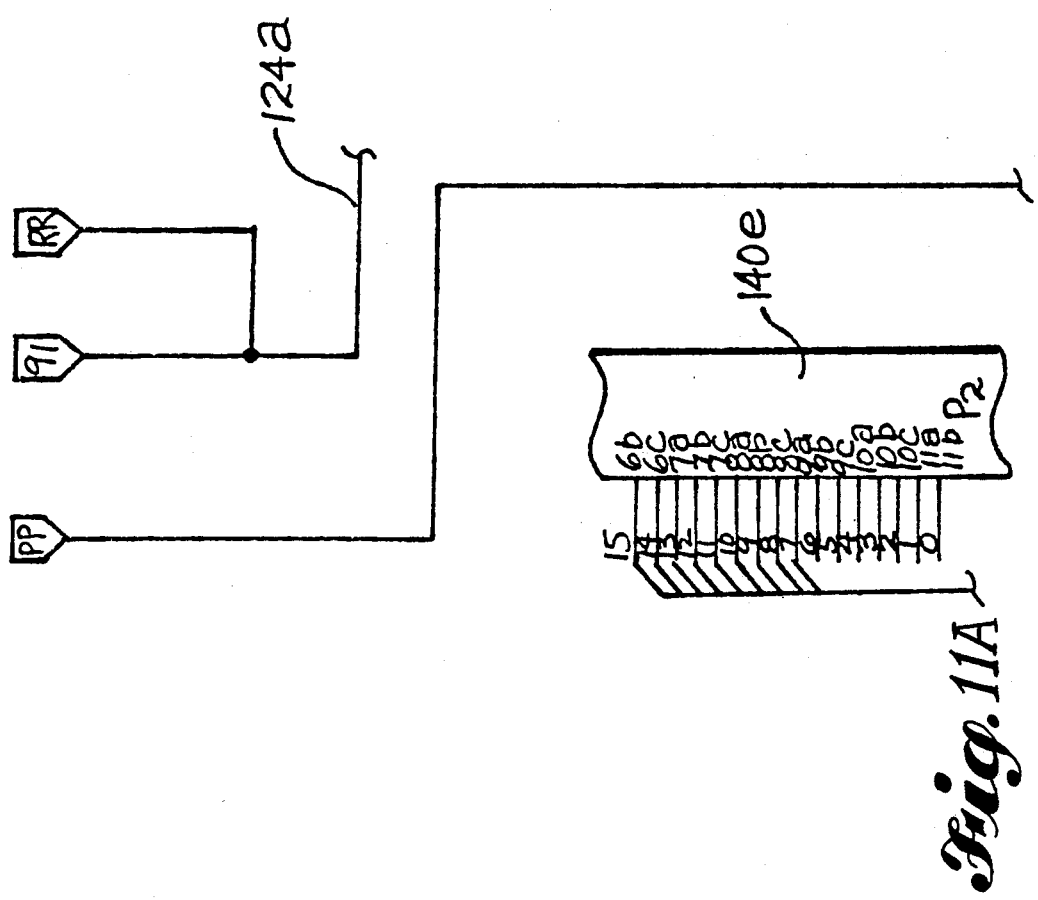
FIGS. 11A and 11B are eighth electrical schematic that is to be read in conjunction with FIGS. 4–10.
Figure 11B:
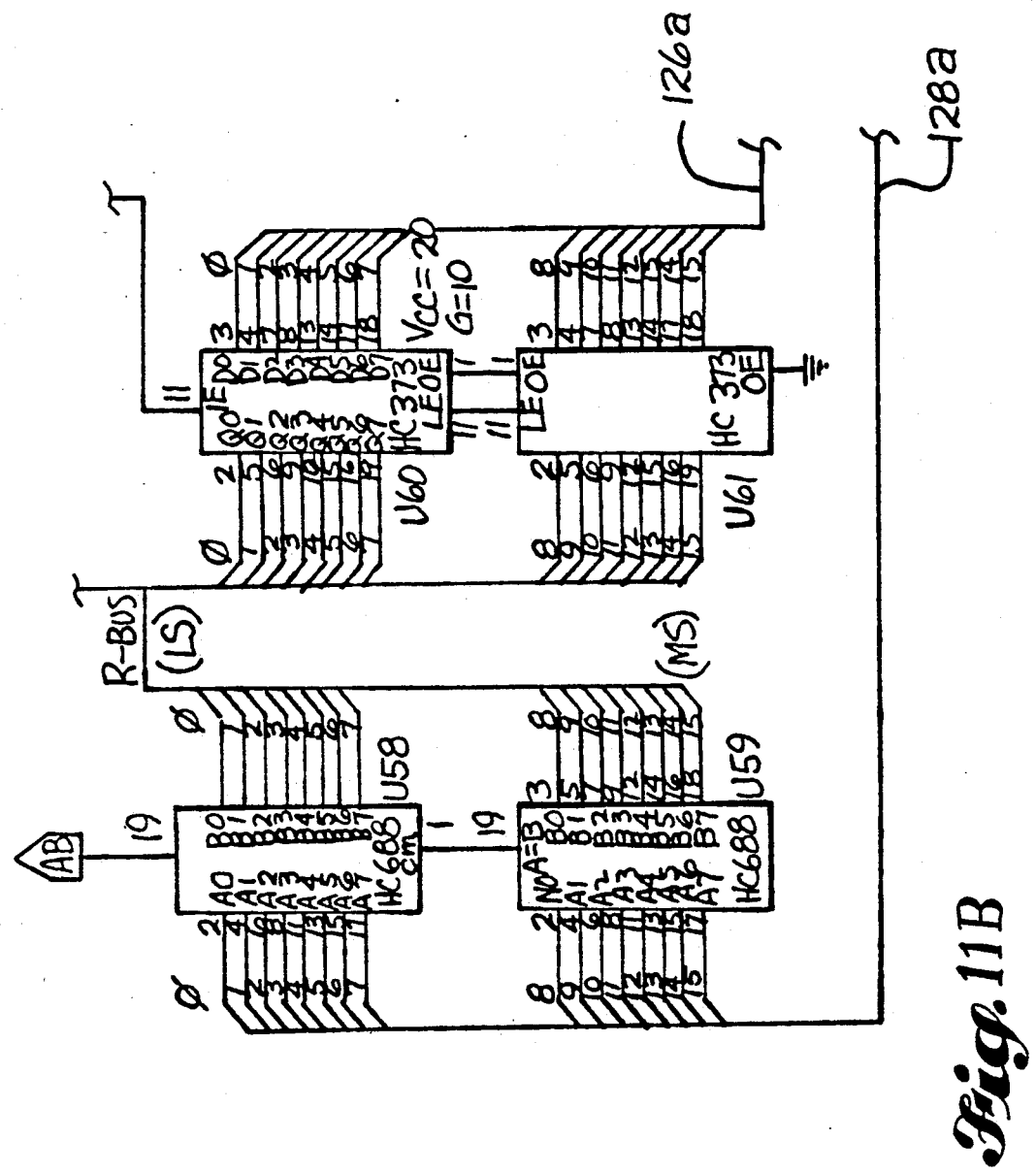
Figure 12A:
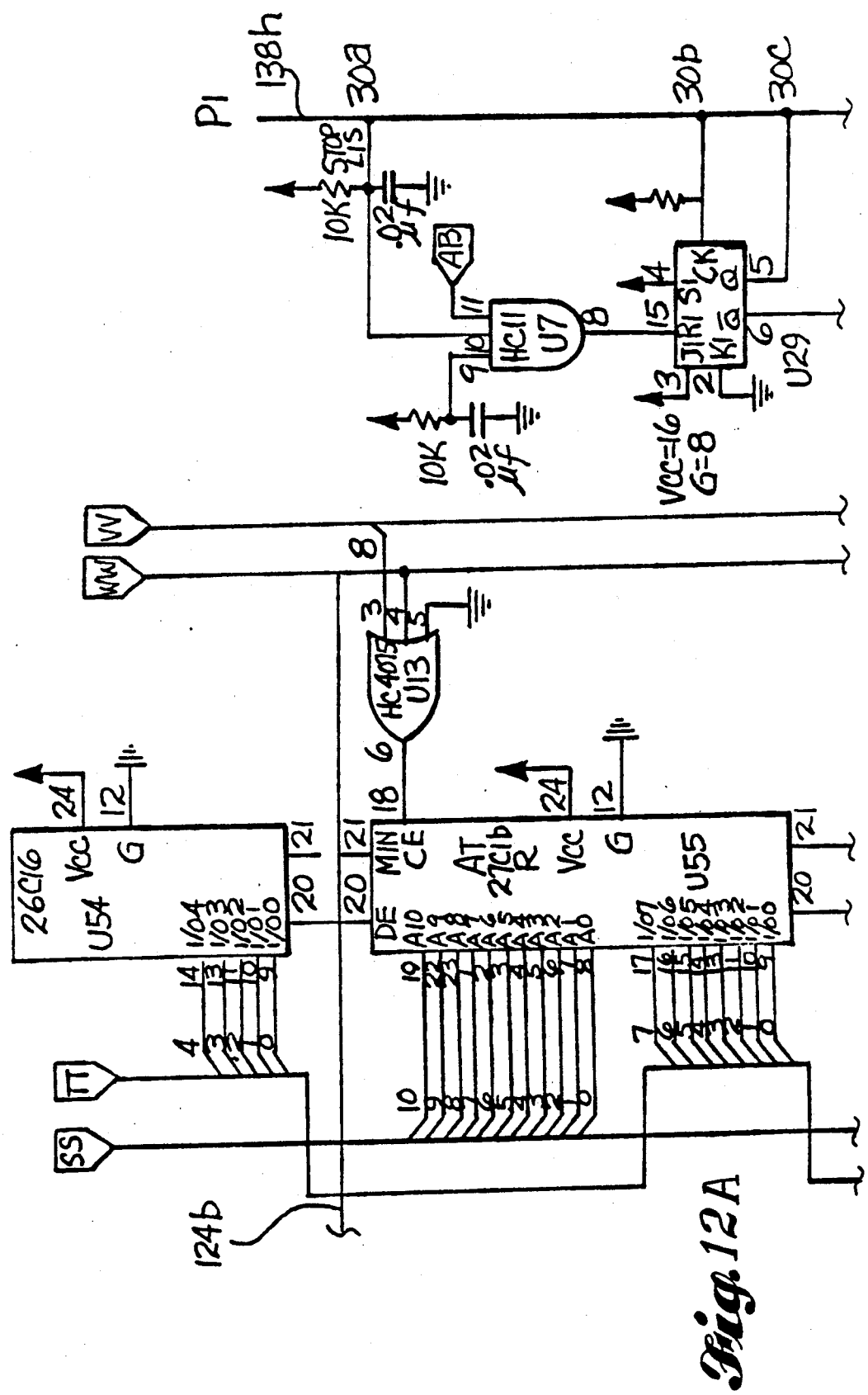
FIGS. 12A and 12B are ninth electrical schematic that is to be read in conjunction with FIGS. 4–11.
Figure 12B:
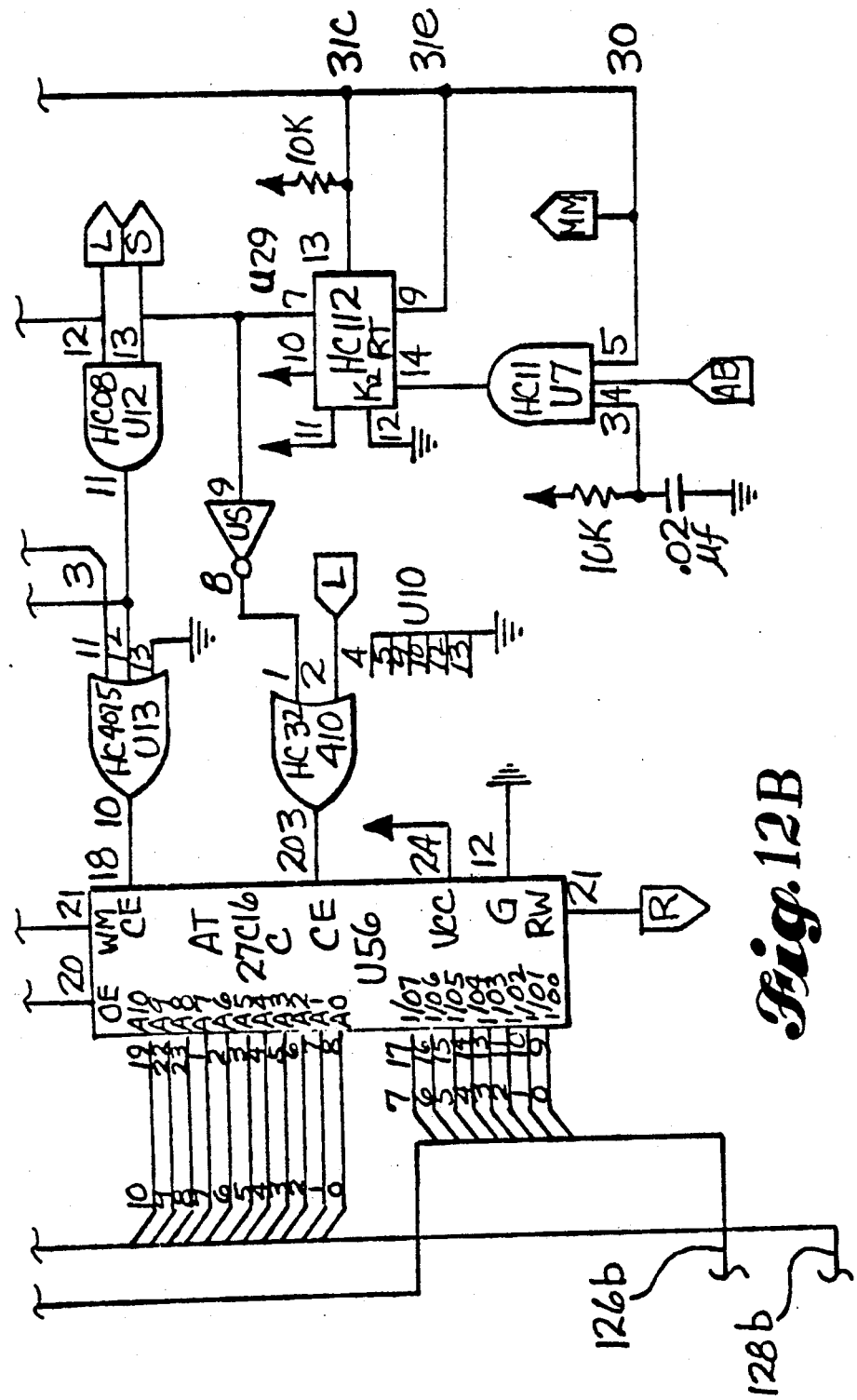

Further, FIGS. 11 and 12 are to be read together where lines 124a, 126a, and 128a on the right-hand side of FIG. 11 respectively connect to lines 124b, 126b and 128b on the left-hand side of FIG. 12.

In addition to the connections described above, FIGS. 4–12 include other connecting symbols which further indicate how the various components shown on the figures are connected together. Referring to FIG. 4, for example, at the bottom of this figure are four connecting symbols 130a, 132a, 134a, 136a. Each of these includes a two-letter ID. (in this particular case "AA", "BB", "CC" and "DD") surrounded by a five-sided symbol which defines a connection arrow. These symbols indicate electrical connections to corresponding symbols on other sheets of FIGS. 4–12. By way of illustration, symbols 130a, 132a, 134a, 136a indicate electrical connections, respectively, to symbols 130b, 132b, 134b, 136b in FIG. 7, the latter also having corresponding two-letter IDs. Similar connections are indicated throughout FIGS. 4–12, some having two-letter IDs and others having a one-letter ID. This is a conventional mode of identifying electrical connections and, hence, they will not be further described here.

Figure 13A:
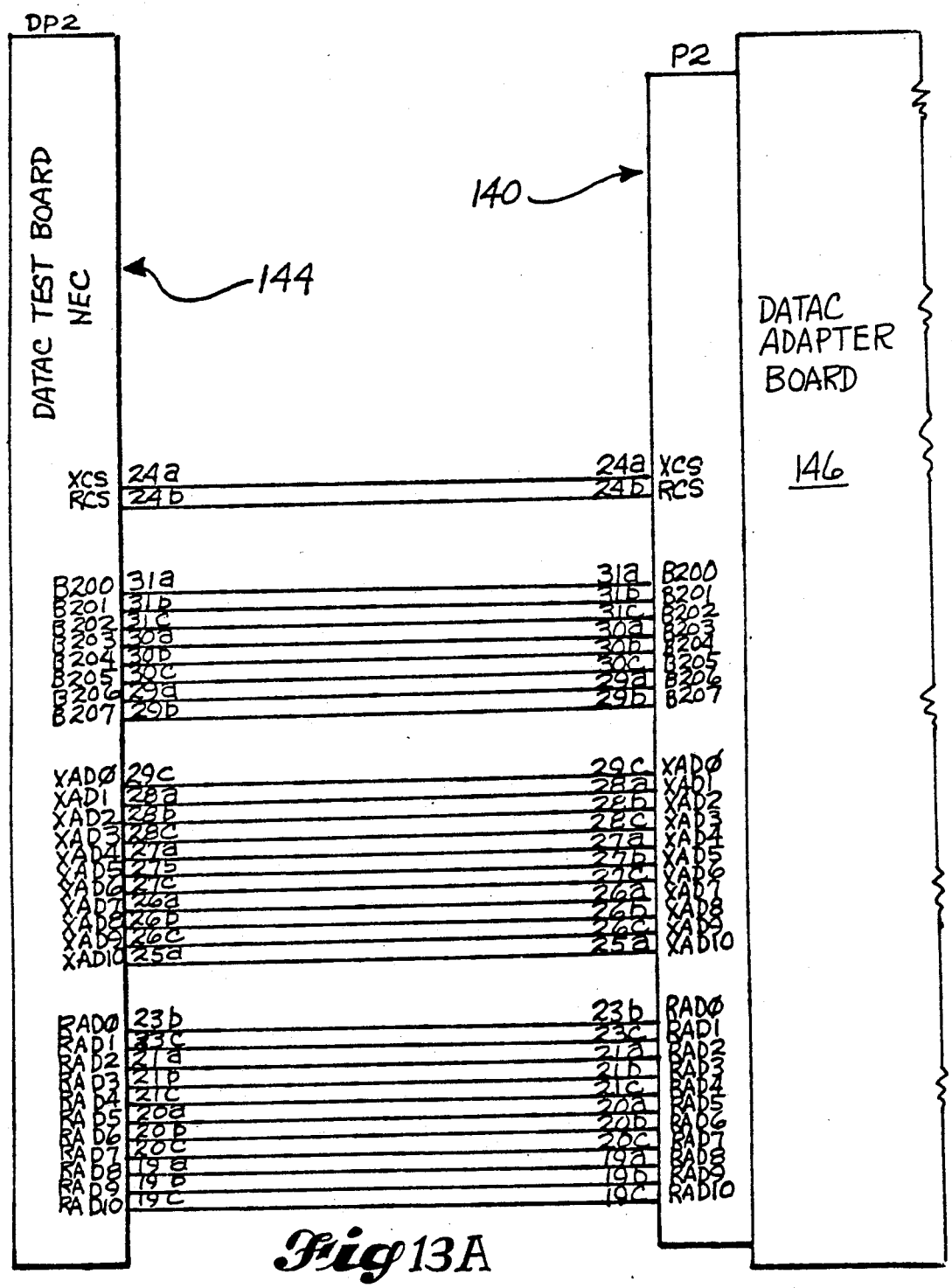
FIGS. 13A and 13B are tenth electrical schematic that is to be read in conjunction with FIGS. 4–12.
Figure 13B:
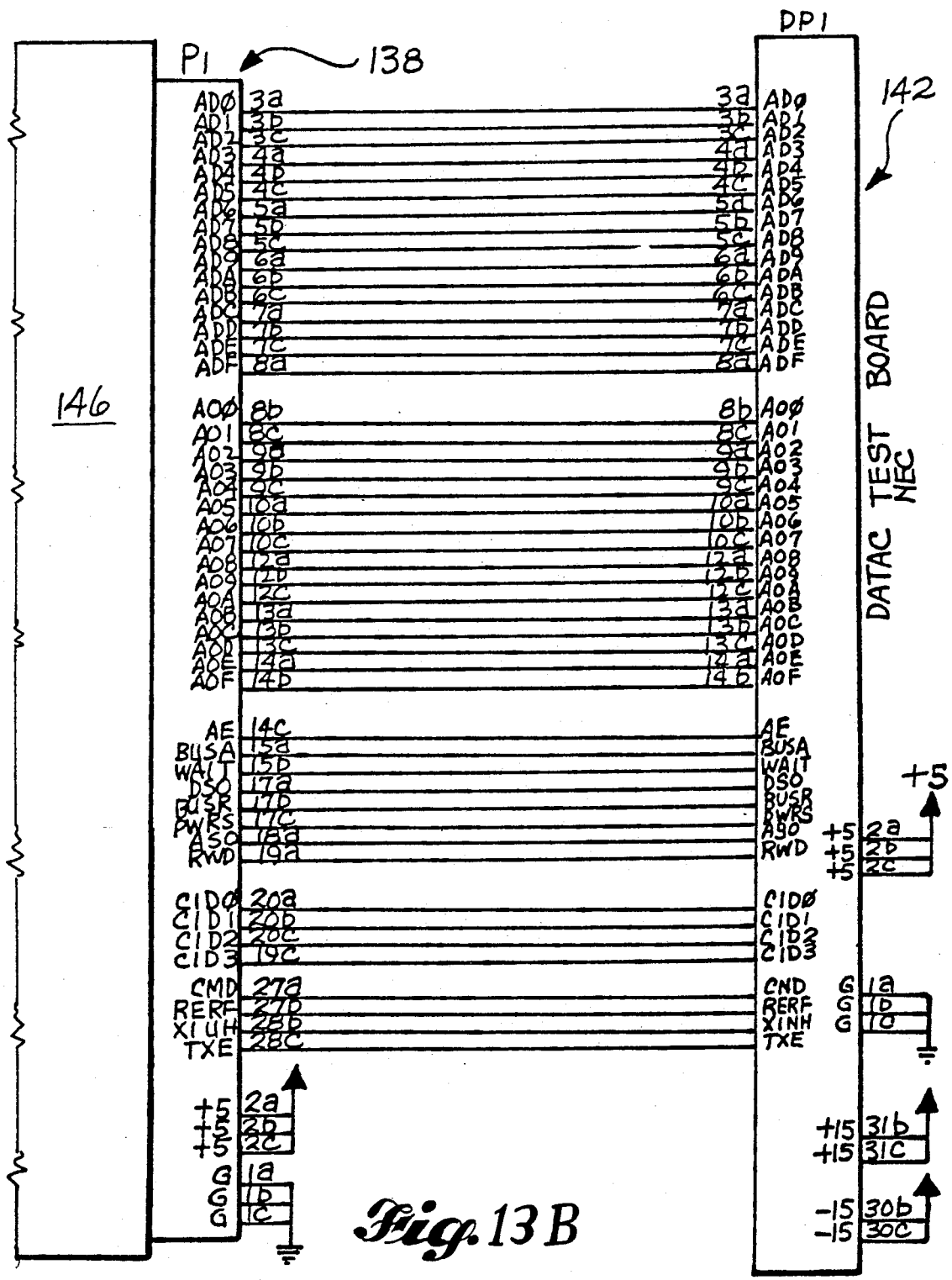

Reference numeral 138a on the left-hand side of FIG. 4; 138b, 138c and 138d on the right-hand side of FIG. 6; numerals 138e, 138f and 138g on the right-hand side of FIG. 9; and numeral 138h on the right-hand side of FIG. 12 all indicate pin connections from various hardware components on the DABT circuit board 12 to an array of pin connections 138 on a DATAC interface adapter board 146 (see FIG. 13). This board 146 physically connects two pin arrays 138, 140 (P1, P2) to similar pin arrays 142, 144 (DP1, DP2) on the previously-mentioned DTB board 14. As should be apparent from the figures, components indicated by numeral 138 are also labeled "P1" in FIGS. 4, 6, 9 and 12.

Similarly, numeral 140a in FIG. 5; 140b in FIG. 8; 140c and 140d in FIG. 9; and 140e in FIG. 11 indicate further pin connections from the DABT circuit board 12 to an array 140 on DATAC interface 146. This is also shown in FIG. 13.

As mentioned previously, the DTB board 14 is a pre-existing unit which is manufactured by the NEC Corporation of Tokyo, Japan. FIG. 13 shows the pin connections which must be made to this board. Arrow 142 generally shows the DP1 connections, and arrow 144 shows the DP2 connections. These connections are further summarized in Tables 1–4 which are in Appendix A attached to this description.

Figure 14:
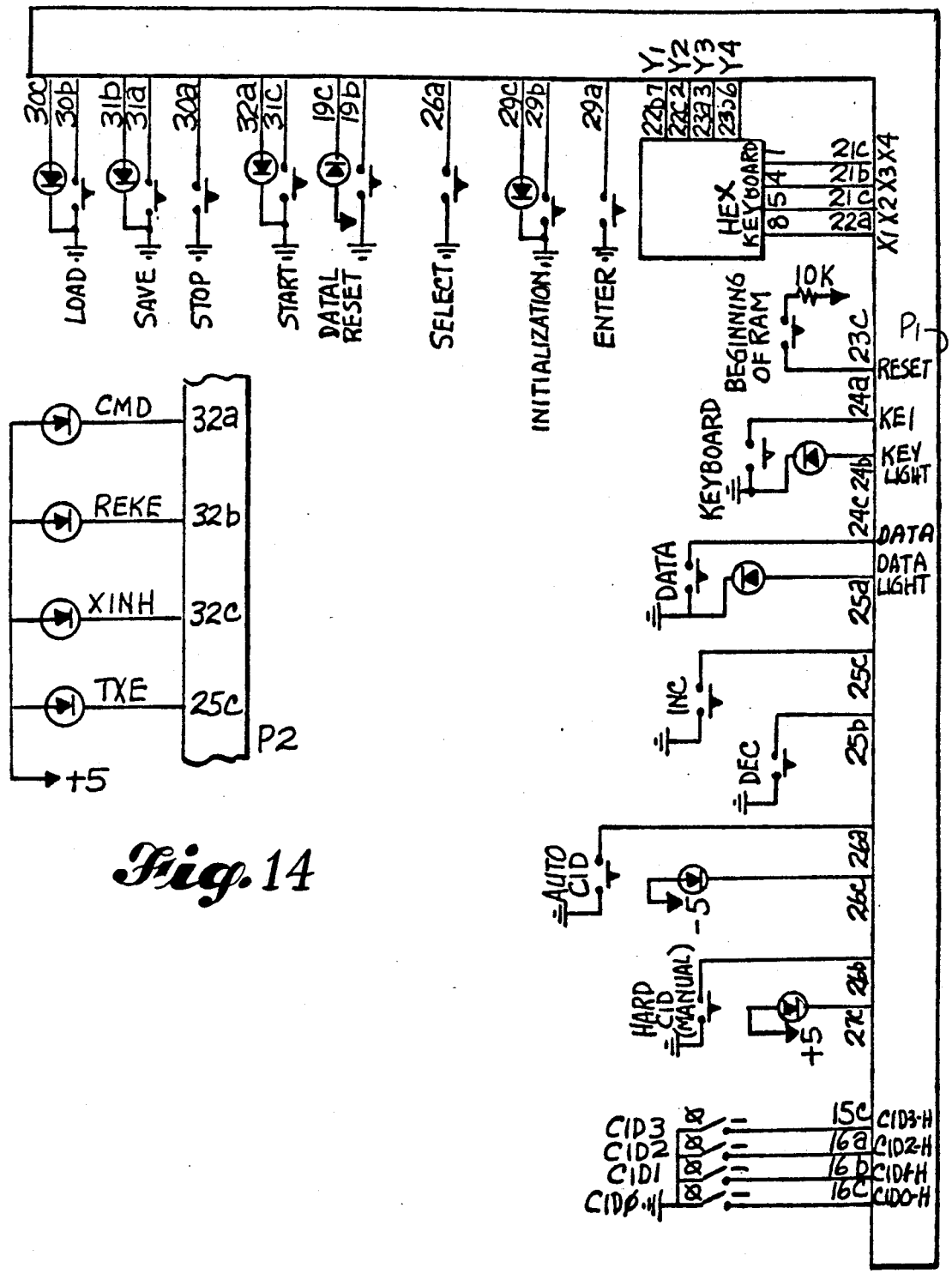
FIG. 14 is an eleventh electrical schematic that is to be read in conjunction with FIGS. 4–13.
Figure 15A:
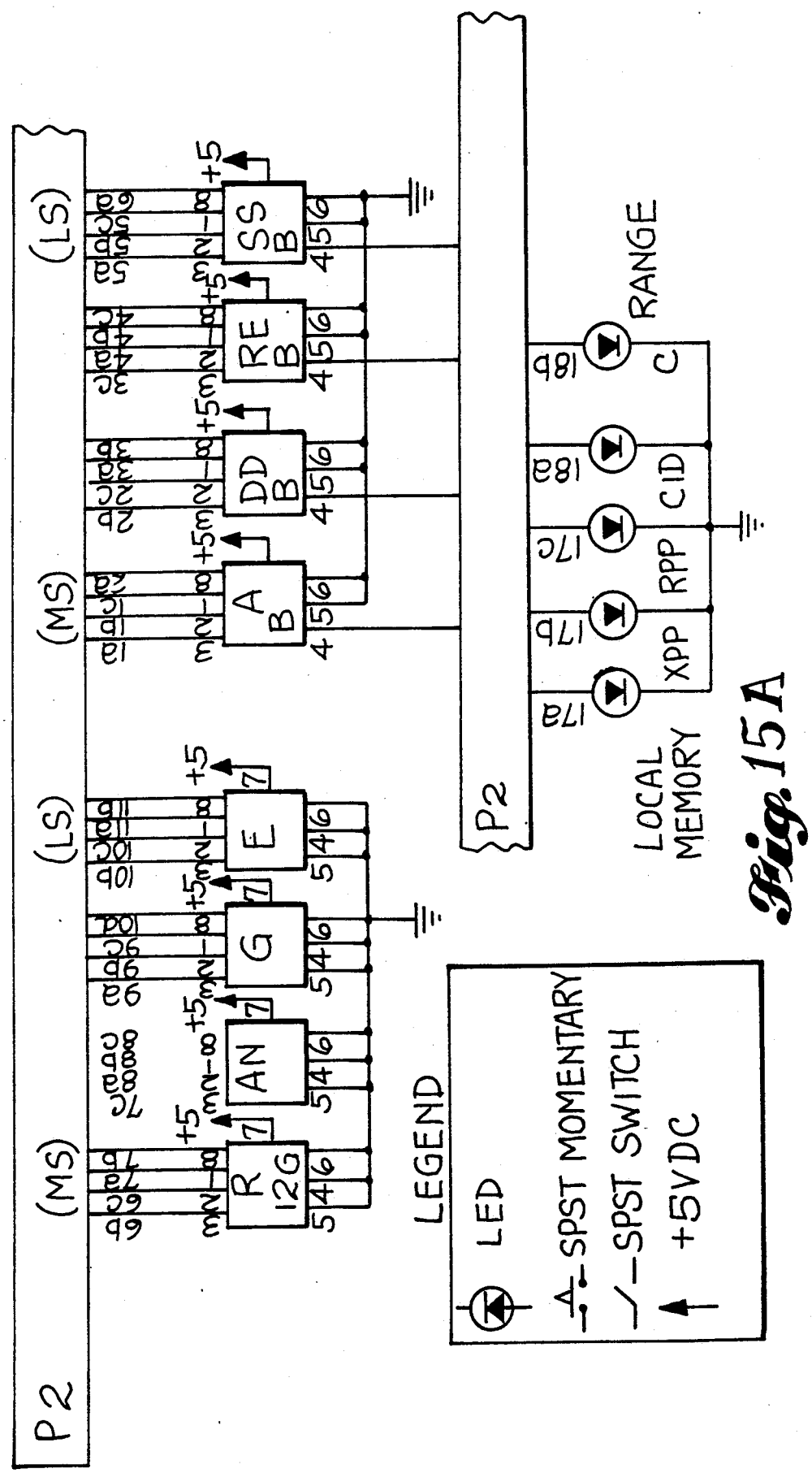
FIGS. 15A and 15B are twelfth electrical schematic that is to be read in conjunction with FIGS. 4–14.
Figure 15B:
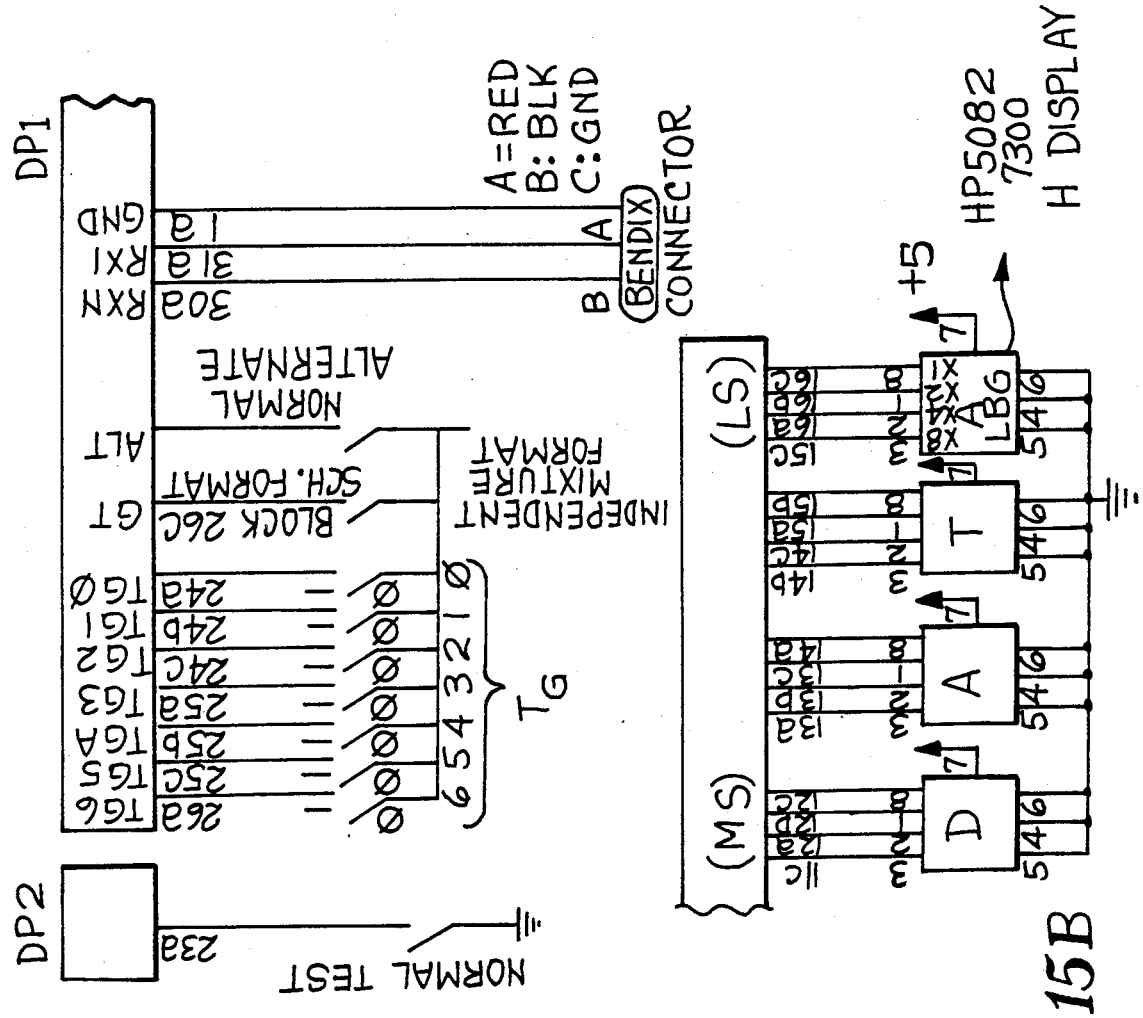

FIGS. 14 and 15 are wiring diagrams which illustrate the wiring of the various previously-described keys and displays on the front panel 10 to the DABT board 12. Similar to FIGS. 4–13, FIGS. 14–15 also illustrate pin connections to pin arrays 138, 140 (P1, P2) on the DATAC adapter board of FIG. 13.

As mentioned previously, the circuitry shown in FIGS. 4–15 consists of conventionally known integrated circuits and related components. All of these items are labeled on the figures by their commonly known part numbers. The inventors also developed and used their own unique "U" number designations to identify discrete parts making up the circuitry and integrated circuit logic of FIGS. 4–15. This type of numbering system would be familiar to the skilled person and the inventors' "U" numbers are also displayed on FIGS. 4–15.

FIG. 3, which summarizes the circuitry of FIGS. 4–15, sets forth the various key integrated circuit components of the device 1 by referring to "U" numbers. For example, block 148 indicates integrated circuit U26 which decodes address/data from the device's keyboard 20. If the information entered on keyboard 20 was preceded by pressing the keyboard key 30, the information is fed as address information to four cascaded up-/down counters 150 (U31, U32, U33, U34). Otherwise, it is latched as data at 152 (U45, U46, U47, U48). Latched addresses may be incremented or decremented in 150 by pressing the INC or DEC keys 36, 38. All keyboard logic is controlled by integrated circuits U27, U11, U28, U42, U2, U15, U19, U20 as indicated at 152 in FIG. 3.

The device's local memory is indicated at 154 (U37, U38); the CID RAM is at 156 (U39); the transmit personality RAM (XPR) is at 158 (U40); the receive personality RAM (RPR) is at 160 (U41); and the EEPROM or nonvolatile memory is at 162 (U54, U55, U56).

The local memory 154, transmit personality (XPR) and receive personality (RPR) memories 158, 160 are what is commonly known as dual-port RAMS. Address information is fed to the left port of these RAMS 154, 158, 160 from the four previously-mentioned cascade counters 150 after buffering at 164 (U35, U36). Further, any "data" which is released from a selected ram is first buffered at 166 (U60, U61) before being displayed on the front panel 10. Any data which is written to the RAMS 154, 156, 158, 160 from keyboard decoder 148 first passes through data latch 151.

The RAM select logic 168 (U23, U51, U4) relates to the select key 54 on the front panel 10. This key uses a decade counter (U51) to step through the "enablement" of the four banks of memory and upper limit of the range that is to be displayed at 42. The load and save keys 56, 58 on the front panel 10 are used to transfer data from and to the EEPROM 162. This is performed by control logic 170 (U6, U7, U9, U12, U3, U24, U25, U12, U14, U5, U17, U16, U57). The EEPROM has bank select logic 169 (U112, U10, U13, U12, U29, U7) which operatively connects it to the save/load logic 170. Read/write logic 172 (U52, U16, U9, U21, U11, U22, U53) operatively connects the save/load logic 170 to the keyboard logic 152.

3. Receive/Transmit and Memory Editing Operations 3.1 Receive Mode

Figure 20:
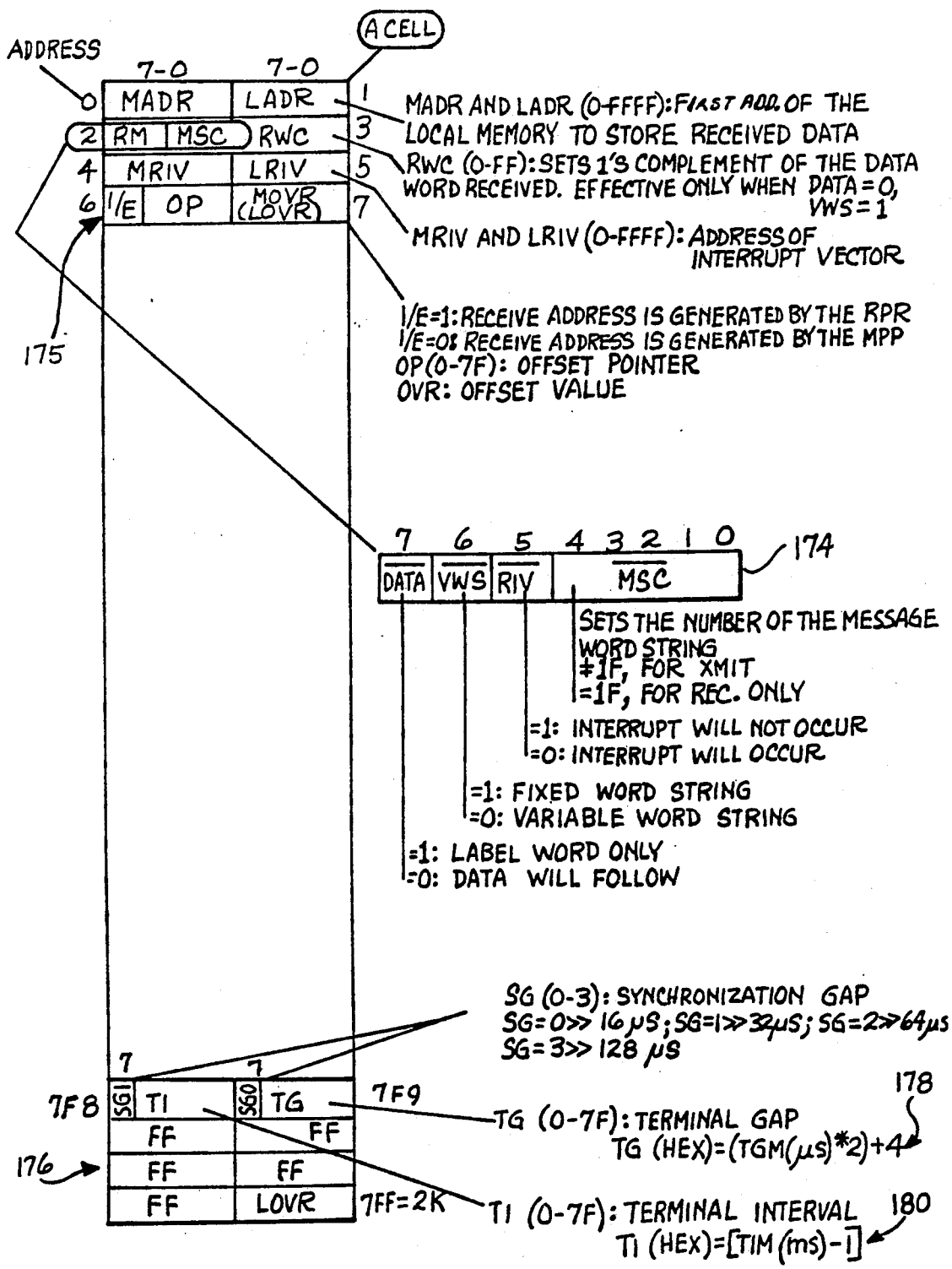
FIG. 20 is a block diagram which illustrates the cell format of the device's receive personality RAM (RPR)

Data which is placed on the DATAC bus by other terminals or systems is received by the device 1 through the receive personality RAM 160 (RPR). The user accomplishes this by first enabling the RPR by activating the select key 54 on front panel 10 (see FIG. 2). That is, the user physically pushes key 54 until the RPR light 48 is activated. At that point, the user enters information in accordance with the format shown on FIG. 20.

Preferably, the RPR 160 is a 16K RAM (2K by 8 bit) that is configured into cells of eight 8-bit words per each label that is to be received from the DATAC bus. Arrow 175 generally indicates one complete cell. The first two words (0, 1), of cell 175, identified by the labels MADR and LADR, respectively, identify the first address of the local memory RAM 154 which is to store received data. Since this address may be as many as 16 bits in length, MADR (word 0) identifies the most significant address bits to be input by the user, and LADR (word 1) identifies the least significant address bits. The third word in cell 175 (word 2), which is identified by labels RM and MSC, is user defined information that is input in accordance with the block that is identified at 174 in FIG. 20. The fifth, sixth and seventh bit locations of the third word identify whether or not interrupt will occur, whether there is a fixed or variable work string, and whether a particular word is a label word only, or whether data will follow. Bits 0–4 of this word are used to set the number of the message work string.

The fourth word (word 3), labeled RWC, sets the "1"s complement of received data words. The fifth and sixth words (words 4 and 5), labeled MRIV and LRIV, respectively, provide the most and least significant addresses of the interupt vector. Lastly, the seventh and eighth words (words 6 and 7) identify (a) whether a received address is generated by the RPR or MPP (bit No. 7 of the seventh word); (b) the value of the offset pointer (bits No. 0–6 of the seventh word); and (c) the offset value OVR (bits No. 0–7 of the eighth word).

The last cell 176, or set of eight words in the RPR memory configuration is used to internally set the synchronization gap, terminal interval (TI) and terminal gap (TG). This is done in accordance with the format indicated at the bottom of FIG. 20. The terminal gap TG is calculated in accordance with equation 178 on FIG. 20, and the terminal interval TI is calculated in accordance with equation 180.

If the user desired to receive information from a particular terminal operating on the DATAC bus, the user would first select a desired label. DATAC would multiply such label by eight. Therefore, the desired label multiplied by eight would identify the first of the eight words or RPR addresses of cell 175 to be defined.

By way of example, if the user selected label 02, he would first activate keyboard key 30 on panel 10, and then enter "16" (02×8) on keyboard 20. This would cause "16" to be displayed at 22 and would indicate the most significant address bits MADR of the address in the local memory RAM 154 where received data is to be written. Thereafter, the user would activate data key 32 and enter MADR in hexadecimal. This would be displayed at 24. This would be followed by activating the enter key 34 which would complete the definition of the first word (16) in the cell for label (02).

Referring again to FIG. 20, the operation described above would correspond to defining word "0" on the upper left-hand corner of FIG. 20. This process would be repeated another seven times until all eight words of cell 175 have been defined (corresponding to defining words 0-7 in FIG. 20, except the RPR addresses would be 16-23).

To actually receive the information from DATAC, the user would once again enable select key 54 until the local memory ram 154 is enabled as indicated at 44 on front panel 10. Then, the user would activate keyboard key 30, followed by typing the address of the local memory at keyboard 20. Going back to the previous example, this address would correspond to the first and second cells of the desired label. Such address would be displayed at 22. The data display 24 would then automatically display the data received from DATAC so that the user can see the received data for information or verification.

Figure 21:
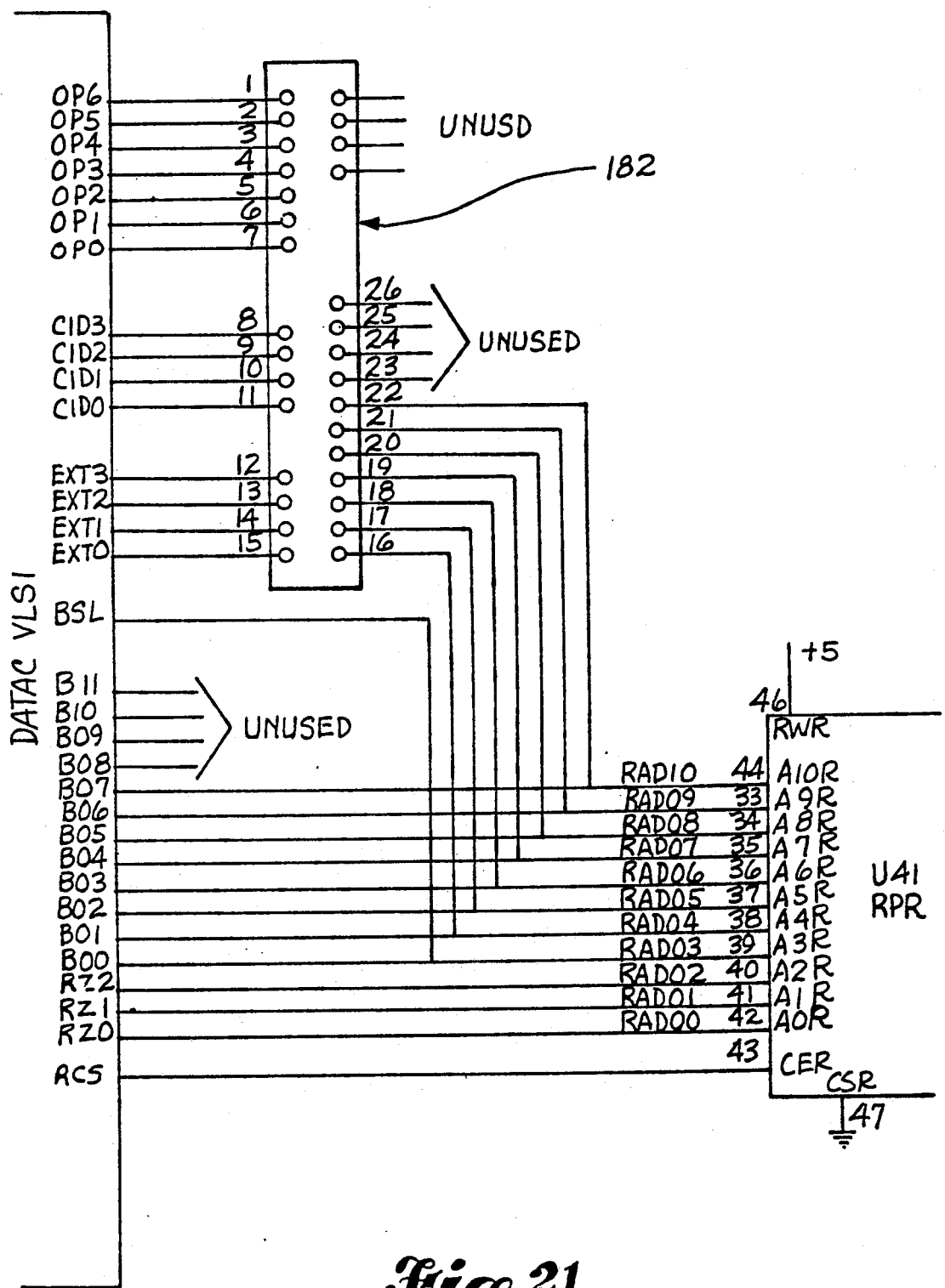
FIG. 21 is an electrical schematic that illustrates wiring of the device's receive personality RAM to the DATAC VLSI.

FIG. 21 illustrates the wiring of the RPR RAM 160 to the DATAC VLSI. This includes wiring to the E7 header card, indicated at 182 which is contained in the DTB board 14 (see FIG. 3).

Figure 25:
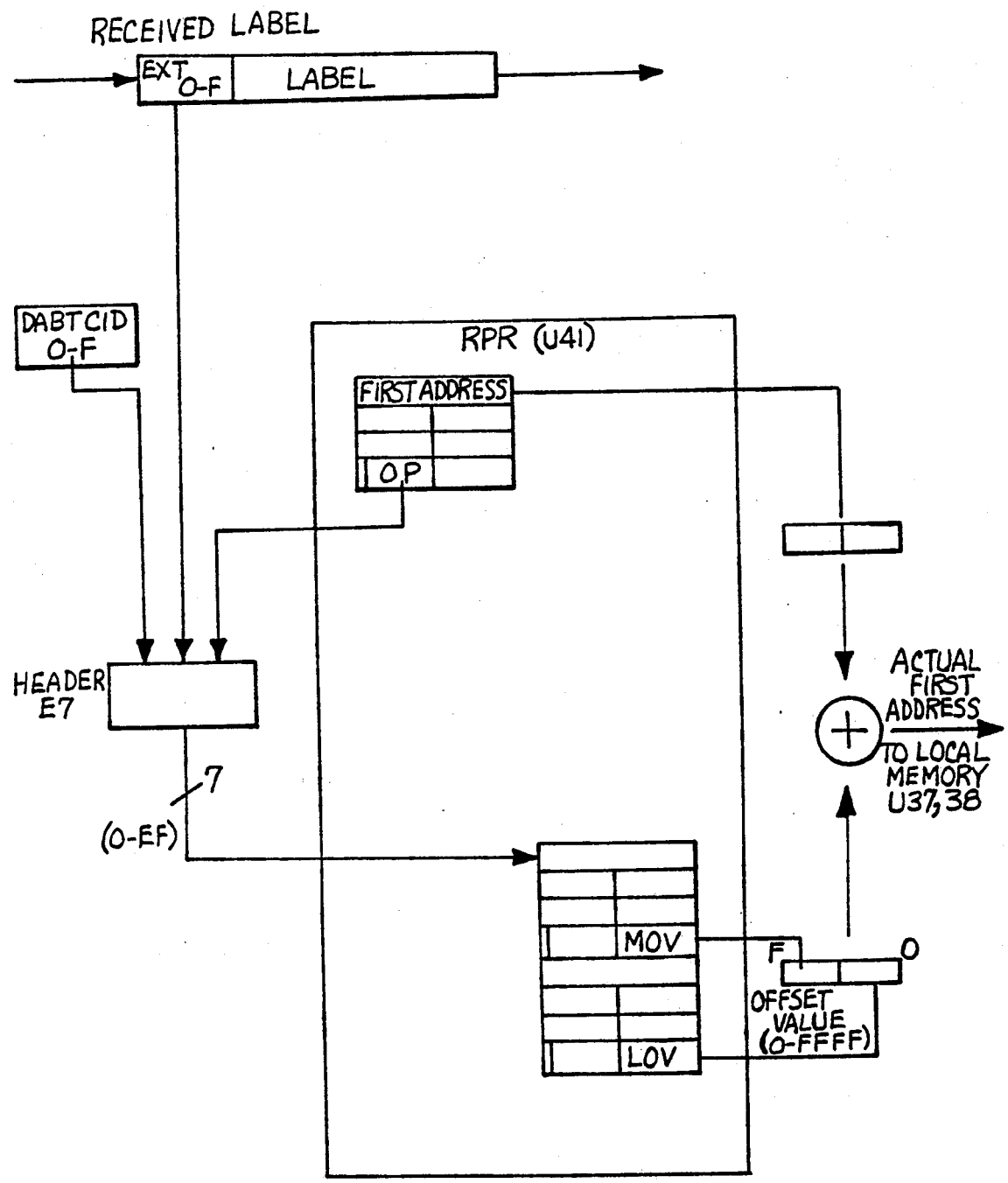
FIG. 25 is a schematic block diagram illustrating offset value generation.
Figure 26:
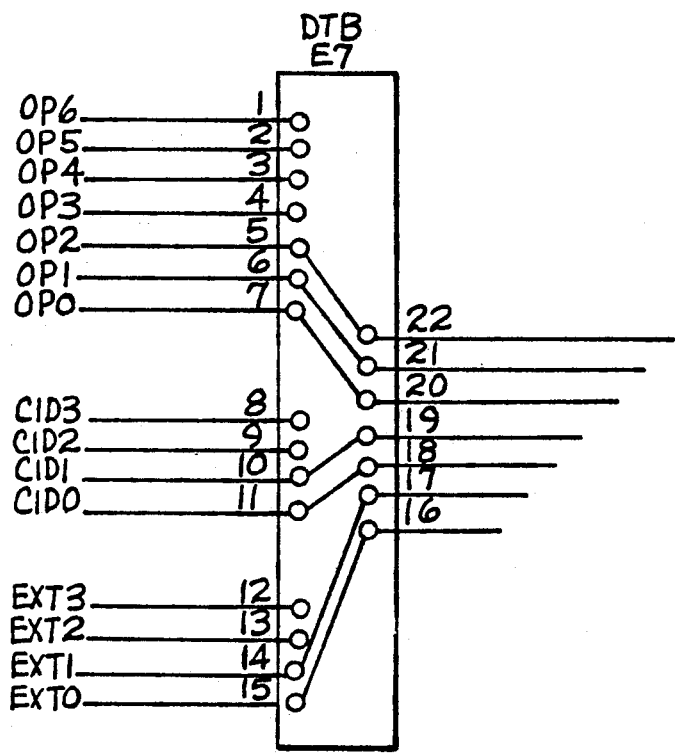
FIG. 26 is a schematic illustrating a certain configuration for a header block in a DTB board which is used along with the test device.

The address where the offset value (word 7 of cell 175 in FIG. 20) is stored (MOV/LOV, bit 7th of each two consecutive cells) is generated from: (a) the DABT CID, (b) the label extension (EXT) from the received label word, and (c) the offset pointer (OP) in the RPR cell. This is shown in FIG. 25. The configuration of the E7 header in the DTB is user-definable. FIG. 26 shows a set-up for four distinct EXT on the DATAC bus, four different channel IDs and eight different offset patterns.

3.2 Transmit Mode

Figure 22:
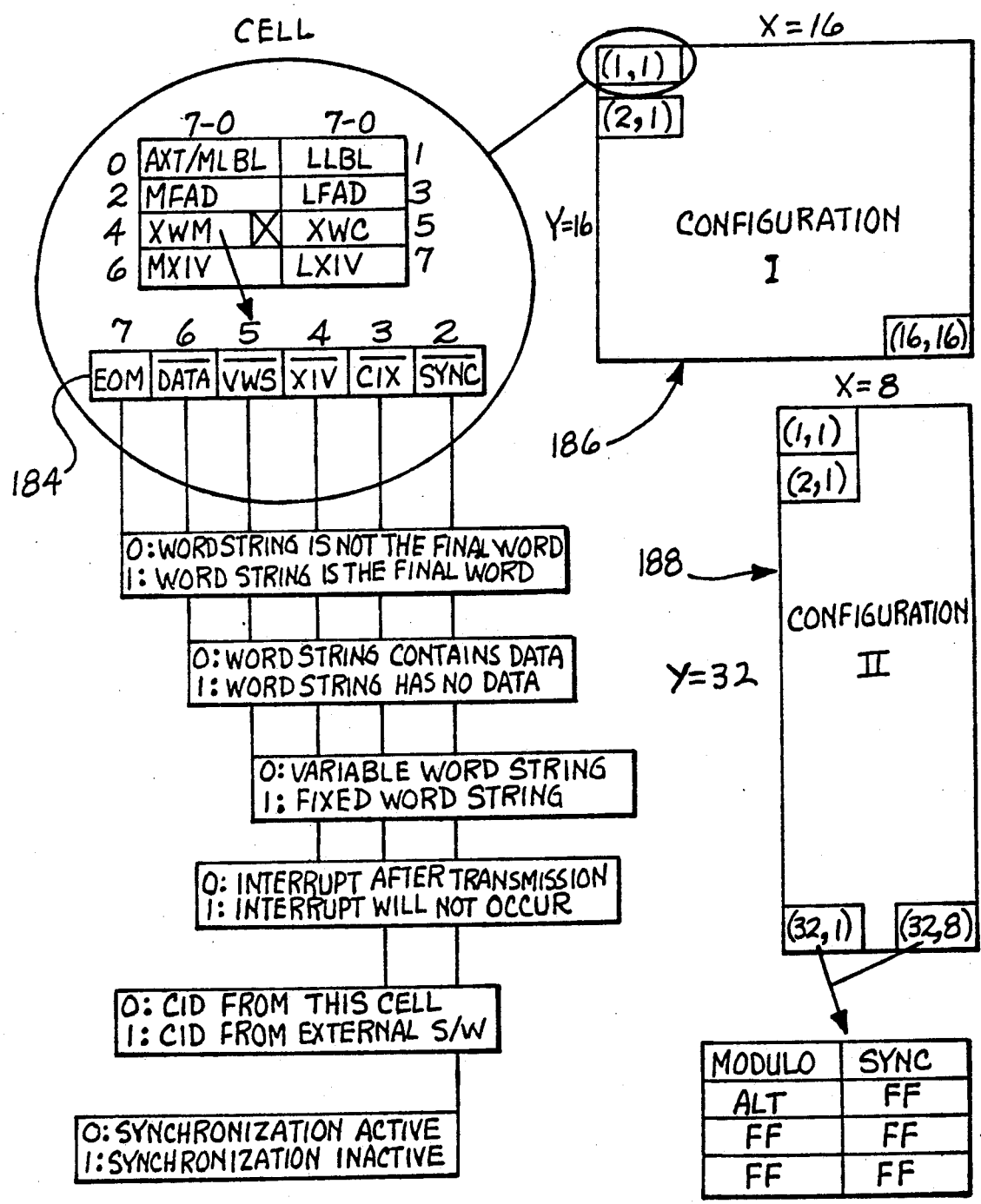
FIG. 22 is a schematic which illustrates the cell format and memory configuration of the device's transmit personality RAM (XPR)

When the user desires to simulate a transmitting terminal on the DATAC bus, the transmit personality RAM 158 (XPR) is enabled (see FIG. 19). Like the RPR 160, the XPR 158 is configured to have cells of eight words which must be defined for each label. This is illustrated in FIG. 22.

The first and second words (0, 1) define the label. The first word AXT/MLBL (0) defines the most significant bits for the label, and the second word LLBL (1) defines the least significant bits. AXT (O-F in hexadecimal) is the extension of the transmitted label. MLBL and LLBL is the label itself.

The third and fourth words (2, 3) MFAD, LFAD define the address of the data to be transmitted which is prestored in the local memory RAM 154. Similar to the configuration of the first and second words (0, 1), the third word (2) defines the most significant address bits and the fourth word (3) defines the least significant bits.

The fifth word (4) XWM defines the information defined in block 184. Briefly, bit No. 7 of this word (4) defines whether or not a word string is the final word; bit No. 6 defines whether the word string contains data; bit No. 5 defines the word string as being variable or fixed; bit No. 4 defines the interrupt; bit No. 3 defines whether or not CID is set internally or externally; and bit No. 2 defines synchronization. Bits No. 1 and 0 are unused in this word (4).

The sixth word (5) XWC of this cell defines the number of words to be transmitted (O-FF). This is set in "1"s' complement, however. Its value is effective only when DATA equals "0" and VWS equals "1".

Lastly, the seventh and eighth words MXIV, LXIV define the address of the interupt vector with the seventh word (6) defining the most significant bits and the eighth word (7) defining the least significant bits.

FIG. 22 also shows two possible matrix configurations for the XPR 158 and its data format. The first configuration, indicated at 186, is a 16 by 16 matrix. This is also shown in FIG. 23 as a 16 by 16 memory map in hexadecimal. The second configuration, indicated at 188, is a 32 by 8 matrix. This is also shown in FIG. 24.

Referring again to FIG. 18, the three switches 84, 86, 88 provided on board 12 (these three switches are generally indicated at 83 in FIG. 1), are provided so that the user of the device 1 can modify the personality PROMs in any fashion desirable. These three switches include an independent/block switch 84; an alternative/normal switch 86; and a normal/test switch 88. The cell (label) transmission order in the XPR 158 is set by the independent/block switch 84. FIG. 27 illustrates the transmission order which is provided by these two modes or configurations.

The user simulates a transmitting terminal by defining the cells (8 words in each cell need to be defined) of the XPR 158. Referring again to FIG. 22, for example, the user must define the eight words shown there (words 0-7) in accordance with the preceding description. By way of example, if the user desired to transmit a label, he would first edit the local memory 154. As described previously, this would involve activating the select key 54 on front panel 10 (see FIG. 2) until the local memory 154 was enabled as indicated at 44. Thereafter, the user would activate the keyboard key 30 and enter at 20 the address location in local memory where the data to be transmitted is stored. This would be followed by activating data key 32 and entering the actual data via keyboard 20, followed by activating the enter key. Prior to defining the cells of the XPR 158, the user would probably define several addressable locations in the local memory which would include data to be transmitted. Entering data in the local memory can either be done before editing the XPR or after. This is up to the user.

The XPR is preferably configured as a two-dimensional array (matrix). Unlike the RPR, there is no multiplication by 8 for the XPR. The key to this RAM is the location of a cell within the matrix, as this determines the order and timing of transmitting a particular label.

Figure 28:
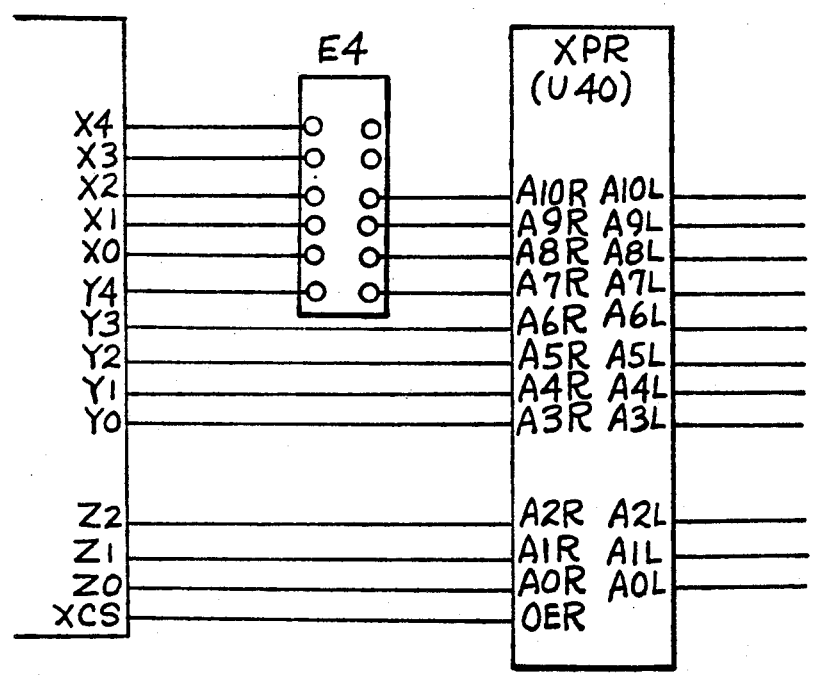
FIG. 28 is a schematic which illustrates the matrix configuration wiring of the device's transmit personality RAM to the DATAC VLSI.
Figure 29:
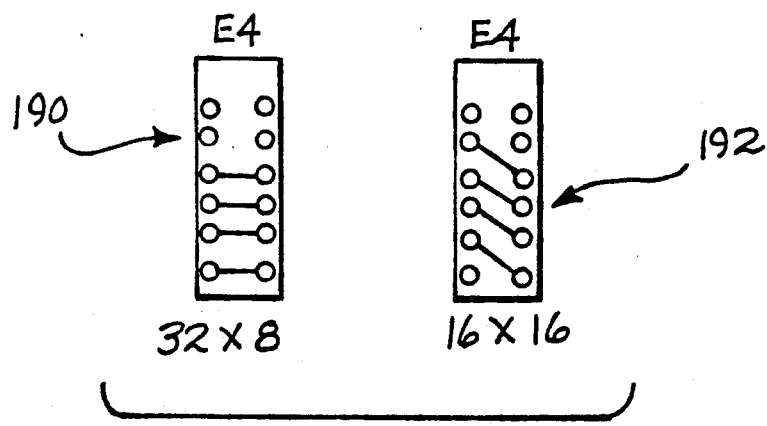
FIG. 29 is to be read in conjunction with FIG. 28, and illustrates two possible matrix configurations for the E4 header block in the DTB board.

The transmit personality RAM 158 (chip U40) informs the DATAC VLSI of the associated memory location in the local memory 154 (chips U37, U38) from which to take (fetch) the data that is to be transmitted with the particular label stored in the transmit personality RAM. The address lines to this RAM are preferably partitioned into X, Y and Z coordinates to allow a matrix representation of the XPR. In the DTB board 14 (see FIG. 3), header E4 is used for this process. FIG. 28 illustrates how header E4 preferably connects the XPR 158 to the DATAC VLSI, and FIG. 29 illustrates two possible configurations for header E4. The first, indicated at 190, is for the matrix configuration of FIG. 24, and the second, indicated at 192, is for the matrix configuration of FIG. 23.

4. Channel ID RAM (CID) Format

Figure 30:
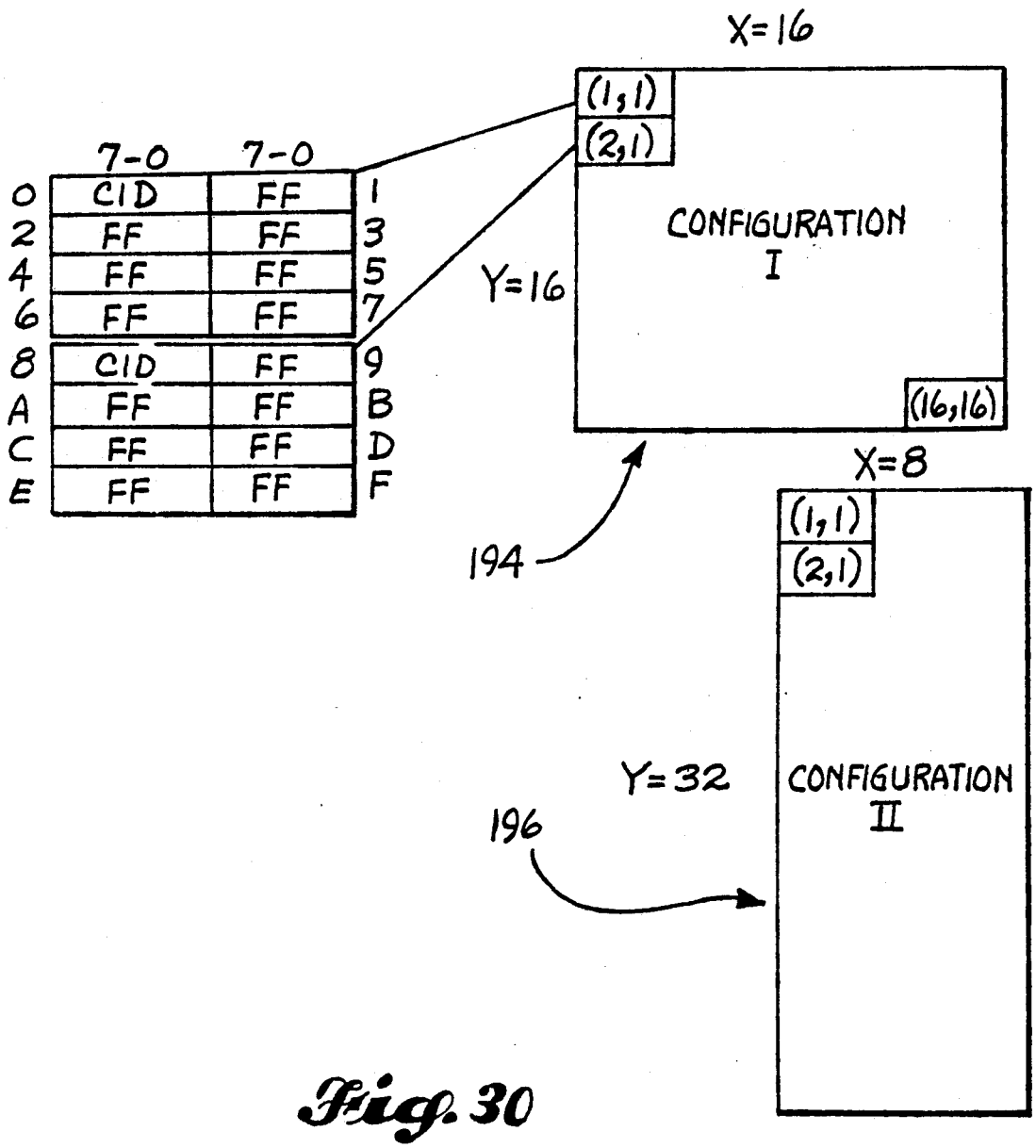
FIG. 30 is a schematic illustrating the cell format for the device's channel I.D. (CID) RAM.

The CID RAM 156 (see FIG. 19) is formatted similarly to the XPR and RPR memories 158, 160. This format is illustrated in FIG. 30. Like the XPR 158, there are two possible configurations, indicated at 194 and 196 in FIG. 30, which respectively correspond to the configurations in FIGS. 23 and 24.

The dynamic CID mode is user-selectible and therefore can be disabled and switched to a manual mode. This is set by the switches 72 (see FIG. 16) on panel 12. The dynamic CID can be used to simulate 16 terminals which is based on their channel ID. Pressing the manual CID key 70 on the front panel 10 (see FIG. 2) configures the system to look for the channel ID from the position of the switches 72 (see also FIG. 16). Pressing the auto CID key 68, causes the system to look up the channel ID from the appropriate memory locations in the CID RAM 156 as selected by the user, in accordance with the format of FIG. 30. The latter mode may be used to generate multiple CIDs while using only one DATAC VLSI. The CID RAM 156 contains the channel ID for each particular label in the XPR 158. In other words, every time a cell in the XPR 158 is addressed, the corresponding CID for that cell is also addressed simultaneously. The data is then written to an octal register 198 (see chip U43 in FIG. 19) for the DATAC chip to read.

5. Save/Load Mode

As mentioned previously, the CID 156, XPR 158 and RPR 160 memories are all volatile memories. If the user desires to save any of the information in these RAMs, he may do so by enabling the EEPROM 162.

To save information, the following procedure should be performed: First, the user activates select key 54 on front panel 10 (see FIG. 2) until the desired volatile memory is selected (any one of the previously-mentioned RAMs). Then, the user activates the save key 58. This is followed by once again using the select key 54 until the range 52 is displayed. At this point, the user enters the upper limit of the range (in hexadecimal) via keyboard 20, which is displayed at 26. This is followed by pressing the start key 60 which begins incremental saving of address/data information until the upper limit of the range is reached. This process may be aborted at any time by activating stop key 62. After this procedure is finished for all desired RAMs, the user may turn the power off at 40, and all of the information will be saved for subsequent use at a later time.

Saved information is reused by a loading operation that is made in accordance with the following procedure: First, the user selects the RAM to be loaded by using select key 54. This is followed by activating load key 56. Thereafter, the user once again uses the select key until the range 52 is enabled. At this point, the user enters the upper limit of the range via keyboard 20, and presses start key 60. This loads the information until loading is complete. This process can also be aborted at any time by activating stop key 62.

When the device is first turned on or power is enabled via switch 40, it is desirable to initialize part or all of the RAMs to a user-defined value. This is accomplished via the following procedure: First, the RAM is selected via select key 54. Then, the initialization key 64 is pressed. This is followed by use of the select key 54 until the range display 52 is on. The user follows this by entering the upper limit of the range via keyboard 20 and pressing the start key 60. This operation can be aborted by activating stop key 62.

6. DATAC Interface

The DTB board 14 (see FIG. 3) performs control functions that are necessary to achieve the proper timing of bus protocols and error detection. The DTB 14 has two independent clocks for accomplishing this. The DATAC VLSI transmits data to the bus transceiver device for signal conversion (to Manchester bi-phase) and amplification. As mentioned previously, the terminal interval (TI) is user-definable. It is set by the DIP switches on the DTB. The synch gap (SG) is another bus protocol that is also set on the DTB 14. The terminal gap TG is unique to each terminal and it can be set by the switches 82 on the front panel (see FIG. 17). The equations for configuring TI and TG are shown at 178 and 180 on FIG. 20. The last cell in the RPR 160 must match the switches 82 in FIG. 17.

Physically, the device 10 is set to a unique TG. However, it may simulate multiple terminals or subsystems by means of user scheduling of the messages in the ascending order of their respective TGs. The requirement is to simulate the data transmitted and/or received by a maximum of 16 different terminals via the DATAC bus. The device is not intended to simulate the DATAC protocol features, but is intended only to simulate the communication between various different terminals over the DATAC bus. By way of example, if three terminals are simulated, then the message with the lowest TG is transmitted first, and immediately thereafter the message with the next higher TG, and finally the message with the highest TG is transmitted accordingly in one TI. This repeats for every terminal interval cycle.

Referring again to FIG. 2, the four LEDs 74, 76, 78, 80 on the upper right-hand corner of panel 10 are provided for the purpose of indicating errors that are detected by the DTB box 14.

The DATAC VLSI interfaces with the dual port RAMs 154, 158, 160 on two independent 16-bit parallel buses, which are identified in FIG. 19 and in the other figures as AO and AD buses. The AO bus is used for addressing and the AD bus is used only for data, although the AD bus is capable of providing address information when configuring the various RAMs to either receive or transmit information.

The BUSYR pin on the local memory RAM 154 (U37, U38) is connected to the wait line of the DATAC VLSI. BUSYR is provided for situations where both ports of the memory simultaneously access the same memory location. BUSYR is an active low signal, and it will not exceed the DATAC wait maximum duration. This signal is reset in less than 50 nanoseconds.

DATAC performs direct memory access (DMA). BUSR and BUSA lines are used for data request and data acknowledge between user memory and user local memory. Since the device utilizes dual-port RAMs for its memory, the BUSR and BUSA lines are tied together. The only time that the handshake between the two might be interrupted is when a cell has already been accessed from the other port. If this should happen, the BUSYR signal of the RAM will pull the DATAC wait line low.

The preceding description consititutes the best known way of carrying out the invention. It is to be understood that the device disclosed herein could be altered in many ways without departing from the spirit and scope of what the invention is all about and how it works. Therefore, the description and explanation given here, including the drawings, should not necessarily be taken in the limiting sense. Instead, it is intended that any patent protection due to the applicants under the U.S. laws should be defined by the patent claim or claims which follow, wherein such claims are to be interpreted in accordance with the established doctrines of patent claim interpretation.

APPENDIX A (Tables I–IV are connector pin assignments for P$_1$, P$_2$, DP$_1$ and DP$_2$ pin arrays of FIG. 13.)

TABLE I

| No. | P$_1$ Connections a | b | c |
|---|---|---|---|
| 1 | GND | GND | GND |
| 2 | +5 V | +5 V | +5 V |
| 3 | AD0 | AD1 | AD2 |
| 4 | AD3 | AD4 | AD5 |
| 5 | AD6 | AD7 | AD8 |
| 6 | AD9 | ADA | ADB |
| 7 | ADC | ADD | ADE |
| 8 | ADF | AO0 | AO1 |
| 9 | AO2 | AO3 | AO4 |
| 10 | AO5 | AO6 | AO7 |
| 11 | | | |
| 12 | AO8 | AO9 | AOA |
| 13 | AOB | AOC | AOD |
| 14 | AOE | AOF | AE |
| 15 | BUSA | WAIT | CID3-H |
| 16 | CID2-H | CID1-H | CID0-H |
| 17 | DSO | BUSR | PWRS |
| 18 | ASO | BSAO | Reset-Light |
| 19 | RW0 | Soft-Reset | CID3 |
| 20 | CID0 | CID1 | CID2 |
| 21 | X4 | X3 | X2 |
| 22 | X1 | Y1 | Y2 |
| 23 | Y3 | Y4 | Reset |
| 24 | Key | Key-Light | DATA |
| 25 | DAT-Light | DEC | INC |
| 26 | Auto-CID | Hard-CID | Auto-Light |
| 27 | CMD | RERF | Hard-Light |
| 28 | Select | XINH | TXE |
| 29 | Enter | Init | Init-Light |
| 30 | Stop | Load | Load-Light |
| 31 | Save | Save-Light | Start |
| 32 | Start-Light | | |

TABLE II

| No. | P$_2$ Connections a | b | c |
|---|---|---|---|
| 1 | 15 C-bus | 14 C-bus | 13 C-bus |
| 2 | 12 C-bus | 11 C-bus | 10 C-bus |
| 3 | 9 C-bus | 8 C-bus | 7 C-bus |
| 4 | 6 C-bus | 5 C-bus | 4 C-bus |
| 5 | 3 C-bus | 2 C-bus | 1 C-bus |
| 6 | 0 C-bus | 15 R-bus | 14 R-bus |
| 7 | 13 R-bus | 12 R-bus | 11 R-bus |
| 8 | 10 R-bus | 9 R-bus | 8 R-bus |
| 9 | 7 R-bus | 6 R-bus | 5 R-bus |
| 10 | 4 R-bus | 3 R-bus | 2 R-bus |
| 11 | 1 R-bus | 0 R-bus | DAT-15 |
| 12 | DAT-14 | DAT-13 | DAT-12 |
| 13 | DAT-11 | DAT-10 | DAT-9 |
| 14 | DAT-8 | DAT-7 | DAT-6 |
| 15 | DAT-5 | DAT-4 | DAT-3 |
| 16 | DAT-2 | DAT-1 | DAT-0 |
| 17 | LM-Light | XPP-Light | RPP-Light |
| 18 | CID-Light | Range-Light | Blank MS (4) |
| 19 | RAD8 | RAD9 | RAD10 |
| 20 | RAD5 | RAD6 | RAD7 |
| 21 | RAD2 | RAD3 | RAD4 |
| 22 | Blank (3) | Blank (2) | Blank (1) |
| 23 | TMUX | RAD0 | RAD1 |
| 24 | XCS | RCS | |
| 25 | XAD10 | First Address | TXE-Out |
| 26 | XAD7 | XAD8 | XAD9 |
| 27 | XAD4 | XAD5 | XAD6 |
| 28 | XAD1 | XAD2 | XAD3 |
| 29 | B206 | B207 | XAD0 |
| 30 | B203 | B204 | B205 |
| 31 | B200 | B201 | B202 |
| 32 | CMD-Out | RERF-Out | XINH-Out |

TABLE III

| No. | DP$_1$ Connections a | b | c |
|---|---|---|---|
| 1 | GND | GND | GND |
| 2 | +5 V | +5 V | +5 V |
| 3 | AD0 | AD1 | AD2 |
| 4 | AD3 | AD4 | AD5 |
| 5 | AD6 | AD7 | AD8 |
| 6 | AD9 | ADA | ADB |
| 7 | ADC | ADD | ADE |
| 8 | ADF | AO0 | AO1 |
| 9 | AO2 | AO3 | AO4 |
| 10 | AO5 | AO6 | AO7 |
| 11 | | | |
| 12 | AO8 | AO9 | AOA |
| 13 | AOB | AOC | AOD |
| 14 | AOE | AOF | AE |
| 15 | BUSA | WAIT | |
| 16 | | | |
| 17 | DSO | BUSR | PWRS |
| 18 | ASO | | |
| 19 | RW0 | | CID3 |
| 20 | CID0 | CID1 | CID2 |
| 21 | | | |
| 22 | | | |
| 23 | | | |
| 24 | TG0 | TG1 | TG2 |
| 25 | TG3 | TG4 | TG5 |
| 26 | TG6 | BI | ALT |
| 27 | CMD | RERF | |
| 28 | | XINH | TXE |
| 29 | | BUS TXN (D) | BUS TXO (C) |
| 30 | BUS RXN (B) | −15 V | −15 V |
| 31 | BUS RXI (A) | +15 V | +15 V |
| 32 | | | |

TABLE IV

| No. | DP$_2$ Connections a | b | c |
|---|---|---|---|
| 1 | | | |
| 2 | | | |
| 3 | | | GA |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |
| 16 | | | |
| 17 | | | |
| 18 | | | |
| 19 | RAD8 | RAD9 | RAD10 |
| 20 | RAD5 | RAD6 | RAD7 |
| 21 | RAD2 | RAD3 | RAD4 |
| 22 | | | |
| 23 | TMUX | RAD0 | RAD1 |
| 24 | XCS | RCS | |
| 25 | XAD10 | | |

TABLE IV-continued

| No. | DP₂ Connections | | |
|-----|------|------|------|
|     | a    | b    | c    |
| 26  | XAD7 | XAD8 | XAD9 |
| 27  | XAD4 | XAD5 | XAD6 |
| 28  | XAD1 | XAD2 | XAD3 |
| 29  | B206 | B207 | XAD0 |
| 30  | B203 | B204 | B205 |
| 31  | B200 | B201 | B202 |
| 32  |      |      |      |

APPENDIX B

Table of Abbreviations and Acronyms

ARINC—Aeronautical Radio Incorporated
CID—Channel Identification
DABT—DATAC Adapter/Bus Tester
DATAC—Digital Autonomous Terminal Access Communication
DATAC VLSI—DATAC Very Large Scale Integration
DEC—Decrement
DMA—Direct Memory Access
DTB—N.E.C. DATAC Test Board
EEPROM—Electrically Erasable Programmable Read Only Memory
INC—Increment
PROM—Programmable Read Only Memory
RACU—Remote Acquisition and Control Unit
RAM—Random Access Memory
RPR—Receive Personality RAM
SG—Sync Gap
TG—Terminal Gap
TI—Transmit Interval
VLSI—Very Large Scale Integration
XPR—Transmit Personality RAM

What is claimed is:

1. A data bus tester for use in testing subsystem integration over a digital autonomous terminal access communication (DATAC) bus, said tester being characterized in that it receives the digital information transmitted on said bus by other terminals, and simulates the transmission of certain terminals, said tester comprising:
   (a) a local memory operable to receive and store addressable digital information from said bus, and to store addressable digital information selected by the user of said tester for subsequent transmission on said DATAC bus;
   (b) a receive personality memory, connected to at least said local memory, and operable to identify the label portion of the digital information transmitted by a given terminal on said DATAC bus, and to cause said digital information to be stored in said local memory at an addressable location selected by said user;
   (c) a transmit personality memory, connected to at least said local memory, and operable to transmit a user-selected digital label on said bus, and to cause said local memory to provide certain prestored digital data for transmission along with said label to be transmitted; and
   wherein said memories of paragraphs (a), (b) and (c) above are volatile memories; and further including
   (d) a non-volatile memory, connected to all of said volatile memories, and operable to save user-selected ranges of digital label and data information from said volatile memories, and to load user-selected ranges of said saved information back into said volatile memories;
   (e) user input means for editing the digital information in said volatile and non-volatile memories; and
   (f) output means for displaying to the user the digital information in said volatile and non-volatile memories.

2. The data bus tester of claim 1, including
   a channel identification memory, operatively connected to at least said transmit personality memory, and operable to provide a terminal channel for the digital label transmitted by said transmit personality memory, and said prestored digital data transmitted along with said label.

3. The data bus tester of claim 1, including
   manual channel identification switch means for manually providing a terminal channel for the digital label transmitted by said transmit personality memory, and said prestored digital data transmitted along with said label.

4. The data bus tester of claim 1, wherein said local memory is a dual-port RAM.

5. The data bus tester of claim 1, wherein said receive personality memory is a dual-port RAM.

6. The data bus tester of claim 1, wherein said transmit personality memory is a dual-port RAM.

7. The data bus tester of claim 1, wherein said non-volatile memory is an EEPROM.

8. The data bus tester of claim 1, wherein said user input means includes a front panel having at least a hexadecimal keyboard.

9. The data bus tester of claim 1, wherein said user output means includes a front panel having at least a digital address display, a digital data display and a digital range display.

10. Th data bus tester of claim 1, wherein
    said local memory, said receive personality memory, and said transmit personality memory each comprise a separate dual-port RAM; and further including
    RAM enabling means for selectively activating any one of said dual-port RAMs, to respectively enable storage and retrieval of data to and from said local memory, and to enable said receive personality memory to receive data that is placed on the DATAC bus, and to enable said transmit personality memory to transmit data on said DATAC bus.

11. The data bus tester of claim 10, including
    a channel identification memory, operatively connected to at least said transmit personality memory, and operable to provide a terminal channel for both said user-selected digital label transmitted by said transmit personality memory and said prestored digital data transmitted along with said label.

12. The data bus tester of claim 11, wherein said user input means includes a panel with a hexadecimal keyboard.

13. The data bus tester of claim 11, wherein said user output means includes a panel with a digital address display, and a digital data display.

14. The data bus tester of claim 13, including load key means, mounted to said panel, for loading stored information from said non-volatile memory into any one of said local, receive personality, transmit personality and channel identification memories.

15. The data bus tester of claim 13, including save key means, mounted to said panel, for selectively saving information from at least said transmit personality memory, said receive personality memory, and said channel identification memory by storing such information into said non-volatile memory.

16. The data bus tester of claim 10, wherein said RAM enabling means further includes
select key means, mounted to a panel surface of said tester, for enabling said dual-port RAMs, one at a time, in a certain preselected order.

17. The data bus tester of claim 11, wherein said user input means includes:
a panel with a hexadecimal keyboard; and
at least a digital address display, a digital data display and a digital range display, all of said displays being mounted to said panel; and still further including
increment key means for permitting a user of said tester to increase any value displayed by said digital address display by one digital unit.

18. The data bus tester of claim 17, further including decrement key means for permitting a user of said tester to decrease any value displayed by said digital address display by one digital unit.

* * * * *

Disclaimer 5,111,450 - Joseph T. Cooledge, Bellevue; Reza Sharif, Edmonds, both of Washington. DATA BUS TESTER FOR AUTONOMOUS DATA COMMUNICATIONS SYSTEM. Patent dated May 5, 1992. Disclaimer filed September 14, 1999, by the assignee, The Boeing Company.

Hereby enters this disclaimer to claims 1-18 of said patent.

*(Official Gazette, December 28, 1999)*